United States Patent
Yasuie et al.

(10) Patent No.: US 8,000,253 B2
(45) Date of Patent: Aug. 16, 2011

(54) DETECTION PROGRAM, RELAY DEVICE, AND DETECTING METHOD

(75) Inventors: Takeshi Yasuie, Kawasaki (JP); Yuji Nomura, Kawasaki (JP); Hideaki Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 12/405,681

(22) Filed: Mar. 17, 2009

(65) Prior Publication Data

US 2009/0296597 A1 Dec. 3, 2009

(30) Foreign Application Priority Data

Jun. 3, 2008 (JP) ................................ 2008-145981

(51) Int. Cl.
*H04J 11/00* (2006.01)
(52) U.S. Cl. ........ 370/244; 370/242; 370/249; 370/255; 370/256
(58) Field of Classification Search .................. 370/242, 370/230, 252, 244, 249, 256, 255, 258
See application file for complete search history.

(56) References Cited

U.S. PATENT DOCUMENTS

| | | | | |
|---|---|---|---|---|
| 6,463,037 B1 * | 10/2002 | Ooyoshi et al. | ............... | 370/242 |
| 6,810,021 B1 * | 10/2004 | Sakurai | ................ | 370/255 |
| 7,385,930 B2 * | 6/2008 | Yasuie et al. | .................. | 370/244 |
| 7,729,240 B1 * | 6/2010 | Crane et al. | .................... | 370/229 |
| 2005/0286432 A1 | 12/2005 | Yasuie et al. | | |
| 2006/0280133 A1 | 12/2006 | Nomura et al. | | |

FOREIGN PATENT DOCUMENTS

| | | |
|---|---|---|
| JP | A 2006-13809 | 1/2006 |
| JP | A 2006-345224 | 12/2006 |
| WO | WO 2008/117379 A1 | 10/2008 |

* cited by examiner

*Primary Examiner* — Ricky Ngo
*Assistant Examiner* — Dewanda Samuel
(74) *Attorney, Agent, or Firm* — Fujitsu Patent Center

(57) ABSTRACT

Only when a request formed of a plurality of request packets obtained by dividing the request is reconstructed, the request is transmitted to a survey target node that returns a response formed of a plurality of response packets obtained by dividing the response. When no response packet has been received at all from the survey target node, it is determined that any of the request packets has been discarded on a first route from a surveying node as a transmission source of the request to the survey target node. When one or more response packets have been received from the survey target node but the response cannot be reconstructed, it is determined that any of the response packets transmitted from the survey target node has been discarded on a second route from the survey target node to the surveying node as the transmission source of the request packets.

21 Claims, 14 Drawing Sheets

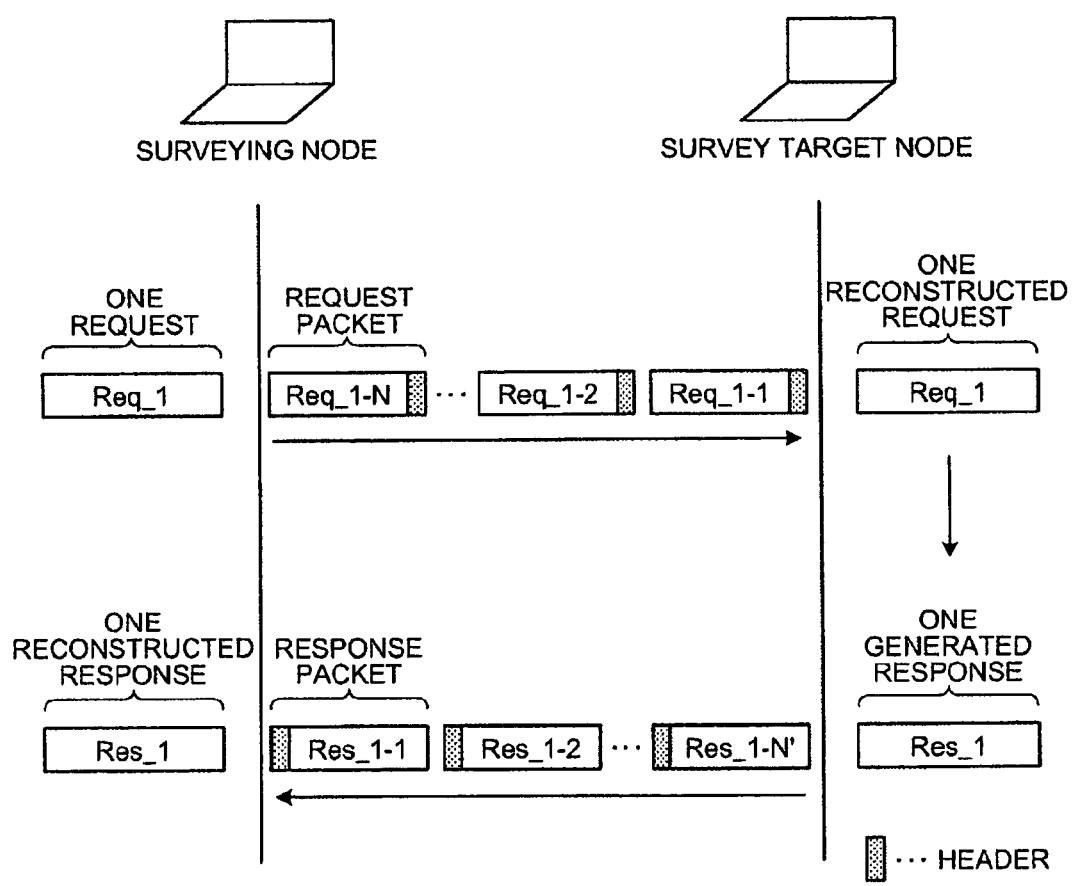

$$\alpha = 1 - (1 - a/S)^{1/N} \quad \cdots (1)$$

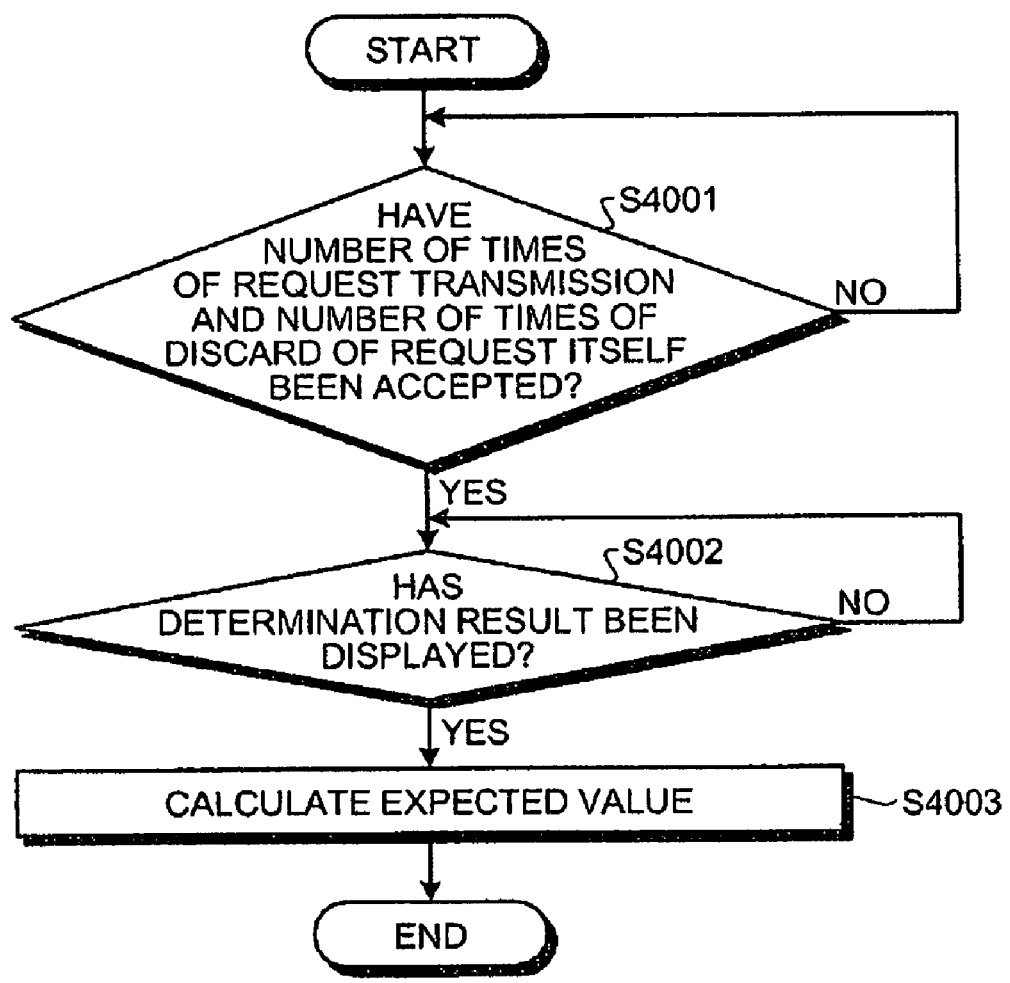

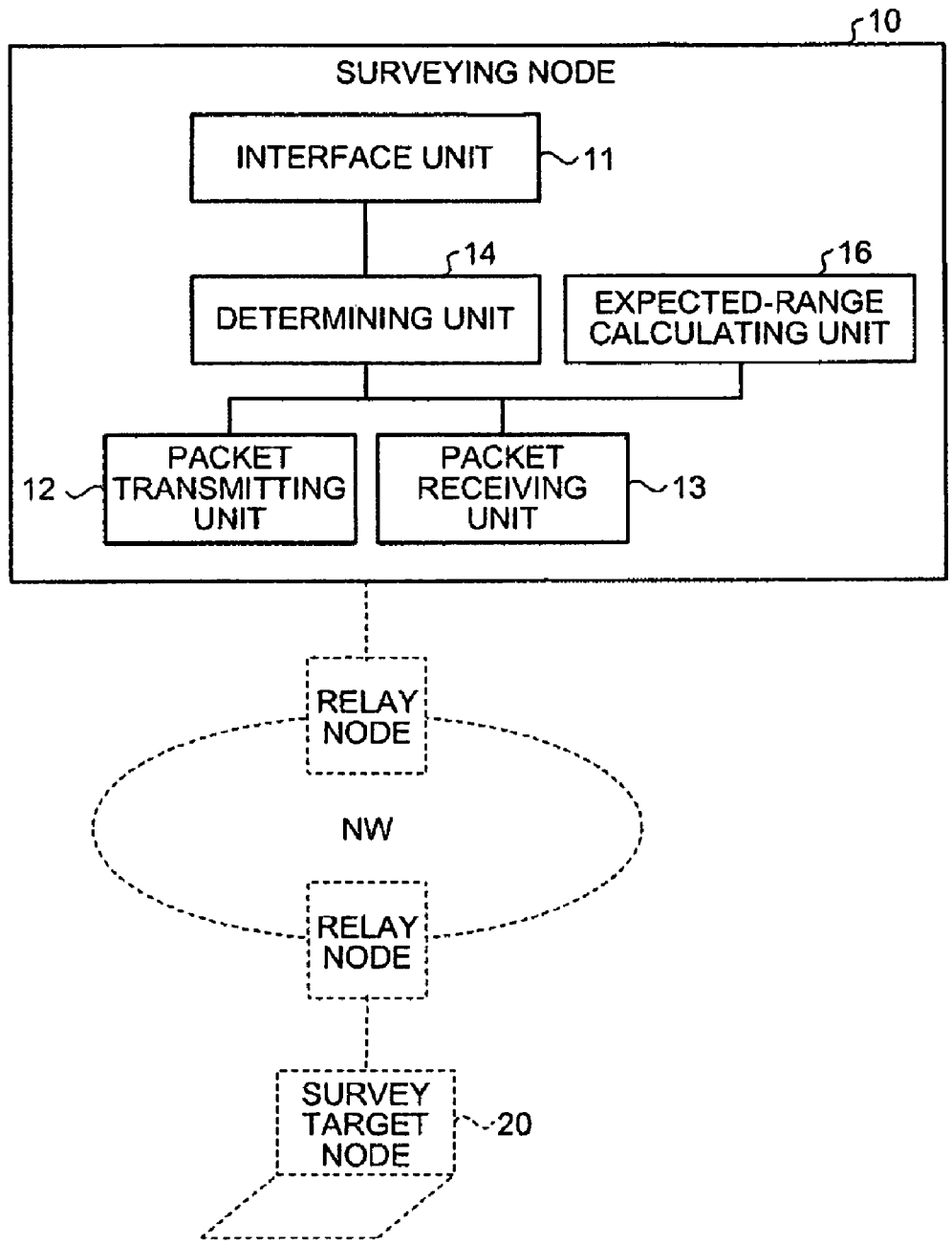

$$\beta = b / \{(S - a) * N'\} \quad \cdots (3)$$

DETECTION PROGRAM, RELAY DEVICE, AND DETECTING METHOD

CROSS-REFERENCE TO RELATED APPLICATION(S)

This application is based upon and claims the benefit of priority of the prior Japanese Patent Application No. 2008-145981, filed on Jun. 3, 2008, the entire contents of which are incorporated herein by reference.

FIELD

The embodiments discussed herein are directed to a detection program, relay device, and detecting method for detecting a packet discard for each route.

BACKGROUND

Conventionally, there is a detection system for detecting a packet discard between a node that makes a survey (hereinafter, referred to as a surveying node) and a node to be surveyed (hereinafter, referred to as a survey target node). This detection system is now briefly explained. The surveying node, which is a relay node arbitrarily selected from among relay nodes forming a network, is connected to the survey target node, which is another relay node, via a plurality of relay nodes.

Under this network configuration, the surveying node transmits a request message packet including all request messages for requesting a response to the survey target node. On the other hand, when receiving the request message packet from the surveying node, the survey target node generates a response message packet including all response messages, and returns this response message packet to the surveying node.

Here, when not receiving a response message packet from the survey target node, the surveying node determines that a packet discard has occurred between the surveying node and the survey target node. Also, when receiving a response message packet from the survey target node, the surveying node determines that a packet discard has not occurred between the surveying node and the survey target node.

Meanwhile, the detection system has a problem in which a packet discard for each route cannot be detected. That is, the surveying node obtains the same detection result when the request message packet is discarded and when the response message packet is discarded.

Therefore, a network administrator using this detection system detects a packet discard for each route by using the following detecting method.

The surveying node transmits a plurality of request message packets to the survey target node. Every time the surveying node transmits a request message packet, the surveying node adds "1" to the number of transmission of request message packets indicative of the number of request message packets transmitted from the surveying node to the survey target node to count the number of transmission of request message packets.

Also, the surveying node receives a response message packet from the survey target node via a route different from a route via which the request message packet is transmitted. Every time the surveying node receives a response message packet, the surveying node adds "1" to the number of reception of response message packets indicative of the number of response message packets received from the survey target node to count the number of reception of response message packets.

The survey target node receives a request message packet from the surveying node. Every time the survey target node receives a request message packet, the survey target node adds "1" to the number of reception of request message packets indicative of the number of request message packets received by the survey target node from the surveying node to count the number of reception of request message packets.

Also, when receiving a request message packet from the surveying node, the survey target node returns a response message packet to the surveying node via a route different from a route via which the request message packet is received. Every time the survey target node returns a response message packet, the survey target node adds "1" to the number of transmission of response message packets indicative of the number of response message packets transmitted by the survey target node to the surveying node to count the number of transmission of response message packets.

Then, the network administrator obtains the number of transmission of request message packets and the number of reception of response message packets from the surveying node, and also obtains the number of reception of request message packets and the number of transmission of response message packets from the survey target node.

Subsequently, when the number of transmission of request message packets and the number of reception of request message packets do not match, the network administrator determines that any of the request message packets transmitted from the surveying node to the survey target node has been discarded, detecting a packet discard on the route from the surveying node to the survey target node.

When the number of transmission of response message packets and the number of reception of response message packets do not match, the network administrator determines that any of the response message packets transmitted from the survey target node to the surveying node has been discarded, detecting a packet discard on the route from the survey target node to the surveying node.

The conventional technology explained above is disclosed in, for example, International Publication Pamphlet No. WO2008-117379.

Meanwhile, the detecting method using the conventional detection system disadvantageously forces the network administrator to bear an enormous work cost. For example, the conventional detecting method entails a work cost in which the survey target node has to count the number of reception of request message packets and the number of transmission of response message packets (for example, the survey target node has to install a program for counting the number of reception of request message packets and the number of transmission of response message packets). Moreover, the conventional detecting method entails a work cost of obtaining the number of reception of request message packets and the number of transmission of response message packets from the survey target node. Therefore, the detecting method using the conventional detection system has a problem of forcing the network administrator to bear an enormous work cost.

SUMMARY

According to an aspect of the invention, a computer readable storage medium containing instructions that, when executed by a computer, causes the computer as a relay device that functions as a surveying node to perform transmitting a request to a survey target node that returns a response formed of a plurality of response packets obtained by dividing the response only when the request formed of a plurality of request packets obtained by dividing the request is reconstructed; and determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION DRAWING(S)

FIG. 1 is a drawing for explaining general outlines and features of a detection system according to a first embodiment;

FIG. 9 is a flowchart of a process flow by an expected-value calculating unit;

FIG. 10 is a block diagram of the configuration of the detection system according to the fourth embodiment.

FIG. 11 depicts an equation for calculating an expected range;

DESCRIPTION OF EMBODIMENT(S)

Figure 2A:
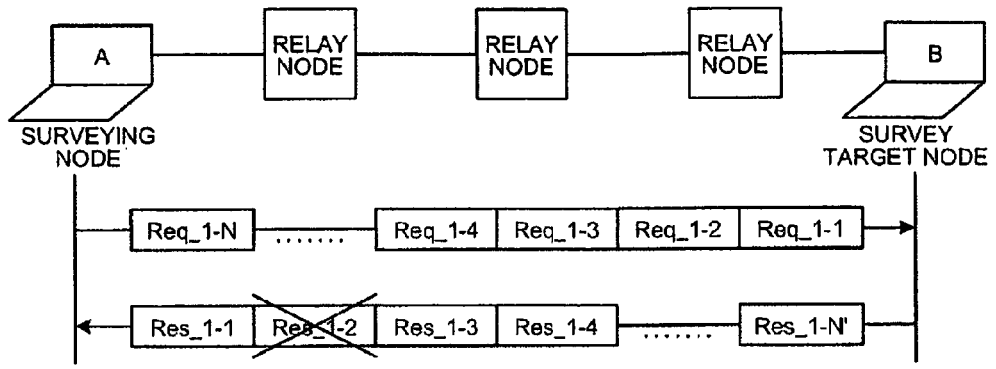
FIGS. 2A to 2C are drawings for explaining general outlines and features of the detection system according to the first embodiment.

Preferred embodiments of the surveying device, detecting method and detecting program according to the present invention will be explained in detail below with reference to the accompanying drawings. In the following, note that a detection system having the present invention incorporated therein is taken as an example for explanation.

[a] First Embodiment

In the following first embodiment, general outlines and features of a detection system according to the first embodiment, the configuration of the detection system, and then a process flow by a surveying node are explained in this order and, finally, effects of the first embodiment are explained.

General Outlines and Features of the Detection System According to the First Embodiment Next, the general outlines and features of the detection system according to the first embodiment are explained by using FIGS. 1 and 2A to 2C. FIGS. 1 and 2A to 2C are drawings for explaining the general outlines and features of the detection system according to the first embodiment.

The detection system according to the first embodiment can be summarized as detecting a packet discard for each route, thereby reducing the load of a network administrator.

That is, a surveying node according to the first embodiment divides a request into a plurality of requests, and transmits a plurality of request packets including the respective requests thus divided, to a survey target node.

For example, as depicted in FIG. 1, the surveying node divides a request (Req_1), which is one message, into a plurality of requests (for example, devices one request into N) in accordance with a maximum transmission unit (MTU) set in advance.

Then, the surveying node generates request packets including the respective divided requests (Req_1-1 to Req_1-N), and transmits the request packets to the survey target node. Note that the process of dividing a request and generating request packets including the respective divided requests is a general process automatically controlled by an Operating System (OS) incorporated in the surveying node.

On the other hand, only when the request can be reconstructed, the survey target node according to the first embodiment replies to the surveying node with response packets obtained by dividing the request again as a response.

For example, the survey target node determines that a request can be reconstructed (in other words, a command for generating response packets is issued) only after the survey target node obtains a fragment of a message indicative of a request from each request packet and obtains fragments of all messages each indicative of a request.

At this time, the survey target node generates a response (Res_1), which is one response message to the request, and divides the response (Res_1) in accordance with the MTU set in advance (for example, divides one response to N'). Then, the survey target node generates response packets including the respective divided responses (Res_1-1 to Res_1-N'), and transmits the response packets to the surveying node. Note that the process of generating response packets including the respective divided responses is a general process automatically controlled by the OS incorporated in the survey target node.

On the other hand, as depicted in FIG. 2A, when the surveying node receives one or more response packets from the survey target node but cannot reconstruct a response, the surveying node determines that any of the response packets transmitted from the survey target node has been discarded.

For example, the surveying node obtains a fragment of a message indicative of a response from each response packet. Here, when not all fragments of messages indicative of a response can be obtained, the surveying node determines that a response cannot be reconstructed. Then, the surveying node notifies the network administrator that a packet discard has occurred on the route from the surveying node to the survey target node.

Figure 2B:
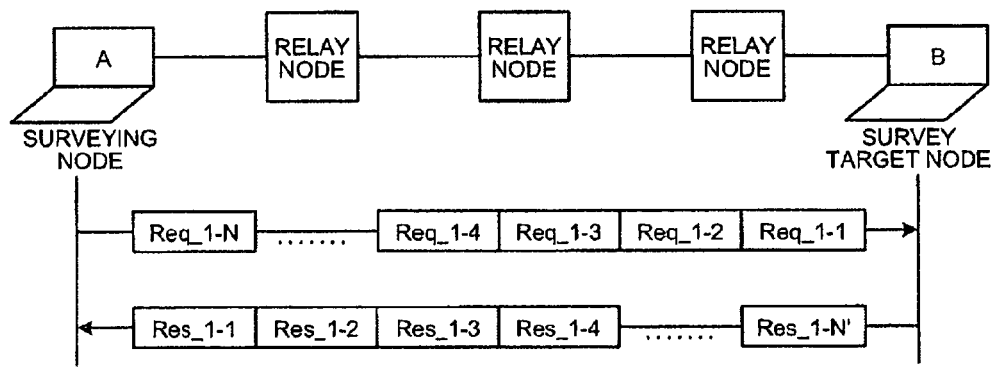

Furthermore, as depicted in FIG. 2B, when the surveying node receives one or more response packets from the survey target node and can reconstruct a response, the surveying node determines that the request packets transmitted to the survey target node and any response packets transmitted from the survey target node have not been discarded at all.

For example, only when obtaining all fragments of messages indicative of a response, the surveying node determines that a response can be reconstructed. Then, the surveying node notifies the network administrator that no packet discard has occurred on the route from the survey target node to the surveying node and on the route from the surveying node to the survey target node.

When not all request packets transmitted from the surveying node can be received, the survey target node cannot determine that the obtained fragments of messages indicates a request (in other words, a command for generating a response packet is not issued), and therefore a response packet is not transmitted to the surveying node.

Figure 2C:
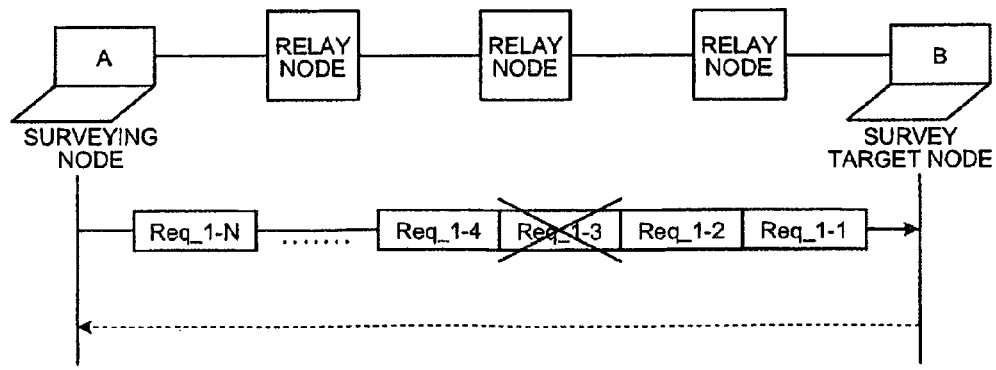

At this time, as depicted in FIG. 2C, the surveying node receives no response packet at all from the survey target node, and therefore, the surveying node determines that any of the request packets transmitted to the survey target node has been discarded.

For example, when not all response packets can be received from the surveying node, the surveying node notifies the network administrator that a packet discard has occurred on the route from the surveying node to survey target node.

From above, according to the detection system according to the first embodiment, the load on the network administrator can be reduced. For example, in the detection system according to the first embodiment, with the detection program being installed only on the surveying node, the result of detecting a packet discard for each route can be obtained, thereby reducing the load on the network administrator.

Configuration of the Detection System

Figure 3:
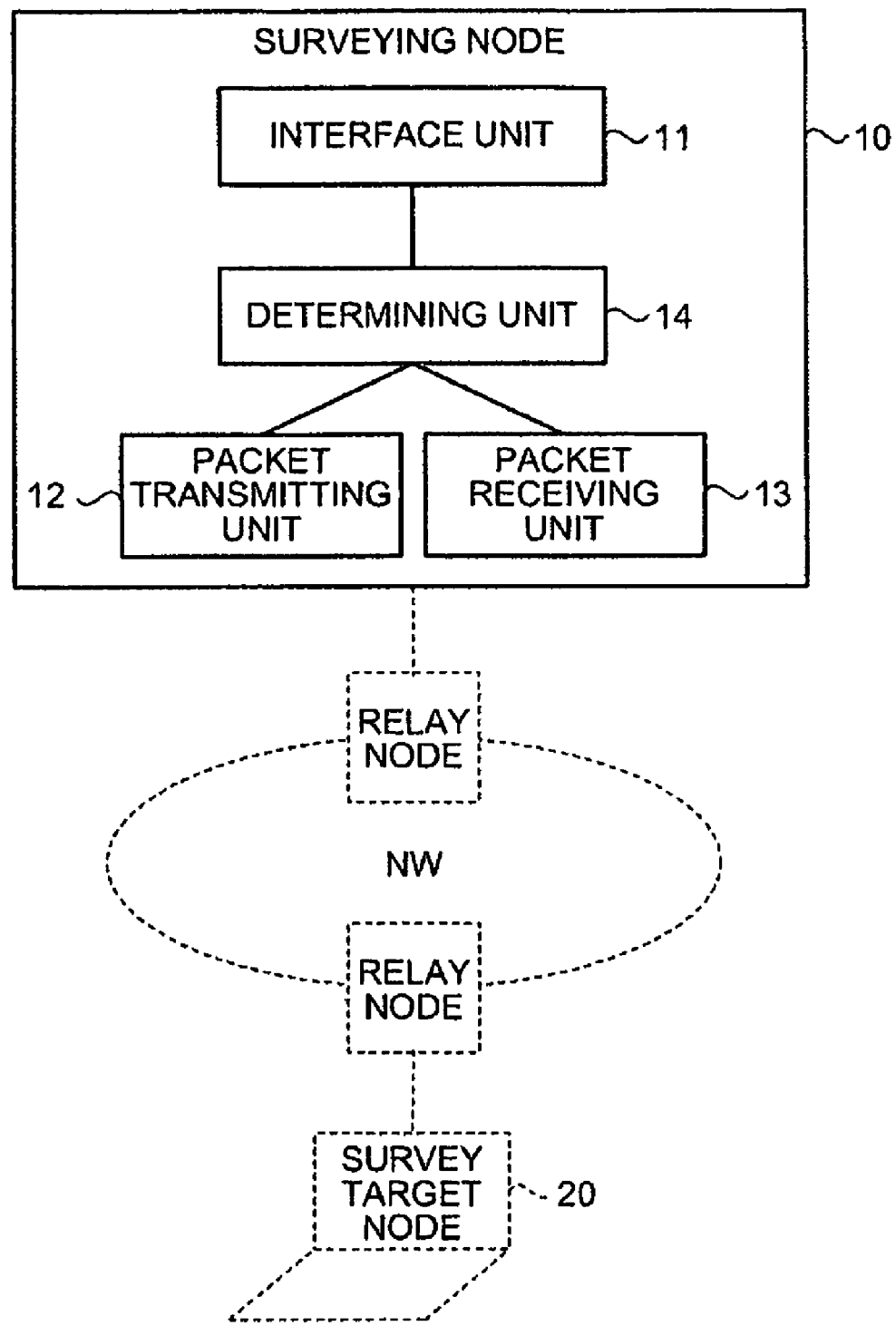
FIG. 3 is a block diagram of the configuration of a detection system.

Next, the configuration of the detection system is explained by using FIG. 3. FIG. 3 is a block diagram of the configuration of the detection system. As depicted in FIG. 3, the detection system includes a surveying node 10, which is a relay node arbitrarily selected from relay nodes forming a network, the relay node having installed therein a detection program; and a survey target node 20, which is a relay node connected to the surveying node 10 via a plurality of relay nodes.

(Surveying Node)

As depicted in FIG. 3, the surveying node 10 includes an interface unit 11, a packet transmitting unit 12, a packet receiving unit 13, and a determining unit 14.

The interface unit 11 accepts various information input by a user. Specifically, the interface unit 11 is formed of a keyboard, a monitor, and others, and accepts a start instruction for surveying a packet discard. Also, the interface unit 11 causes the result of detecting a packet discard obtained by the determining unit 14 to be displayed on the monitor.

The packet transmitting unit 12 divides a request into a plurality of requests, and transmits packets including the respective divided requests to the survey target node 20.

Specifically, when accepting a start instruction for surveying a packet discard via the interface unit 11, the packet transmitting unit 12 divides a request, which is one message, into a plurality of requests in accordance with the MTU set in advance. For example, when 1480 bytes are set in advance as a MTU, the packet transmitting unit 12 divides a request having a data length of 14800 bytes (required length) into ten requests.

Then, the packet transmitting unit 12 generates request packets including the respective divided requests, provides each request packet with a serial number for use in the reconstruction of a request and request-packet identification information for uniquely identifying each request packet, and then transmits the request packets to the survey target node 20.

The packet receiving unit 13 receives response packets from the survey target node 20. Specifically, the packet receiving unit 13 specifies and receives response packets provided with response-packet identification information for identifying each response packet from among packets flowing over the network.

When receiving a first response packet, the packet receiving unit 13 obtains a fragment of a message indicative of a response from the response packet, thereby starting reconstruction of a response. Then, every time the packet receiving unit 13 receives a response packet, the packet receiving unit 13 uses the serial number provided to the response packet to piece together the fragments of the message, thereby reconstructing a response.

When one or more response packets have been received from the survey target node 20 but a response cannot be reconstructed, the determining unit 14 performs a determination process of determining that any of the response packets transmitted from the survey target node 20 has been discarded.

Also, when one or more response packets have been received from the survey target node 20 and a response can be reconstructed, the determining unit 14 determines that the request packets transmitted to the survey target node 20 and the response packets transmitted from the survey target node 20 have not been discarded at all.

Furthermore, when a response packet has not been received from the survey target node 20 at all, the determining unit 14 performs a determination process of determining that any of the request packets transmitted to the survey target node 20 has been discarded.

Specifically, the determining unit 14 monitors the packet transmitting unit 12 and, every time a request packet is transmitted by the packet transmitting unit 12, the determining unit 14 adds "1" to the number of transmission of request packets indicative of the number of request packets transmitted from the surveying node 10 to the survey target node 20, thereby counting the number of transmission of request packets.

Also, the determining unit 14 monitors the packet receiving unit 13 and, every time a response packet is received by the packet receiving unit 13, the determining unit 14 adds "1" to the number of reception of response packets indicative of the number of reception of response packets received from the survey target node 20, thereby counting the number of reception of response packets.

Then, after a predetermined time has elapsed from the time when a request packet is transmitted from the packet transmitting unit 12, the determining unit 14 determines whether a response packet has been received from the survey target node 20. For example, when a post-transmission elapse counter value indicative of an elapsed time from the time when a request is transmitted by the packet transmitting unit 12 reaches a predetermined value set in advance, the determining unit 14 determines whether a response packet has been received from the survey target node 20.

Here, when obtaining a determination result indicating that a response packet has not been received from the survey target node 20 at all (indicating that the number of reception of response packets is "0"), the determining unit 14 determines that any of the request packets has been discarded, and causes a message to be displayed via the interface unit 11, the message for notifying that any of the request packets transmitted from the surveying node 10 to the survey target node 20 has been discarded.

That is, the determining unit 14 causes a message to be displayed, the message for notifying that a packet discard has occurred on the route from the surveying node 10 to the survey target node 20.

On the other hand, when obtaining a determination result indicating that one or more response packets have been received from the survey target node 20 (indicating that the number of reception of response packets is "1" or more), the determining unit 14 determines whether all response packets have been received from the survey target node 20 (in other words, whether a response can be reconstructed from the received response packets).

When obtaining a determination result indicating that not all response packets have been received from the survey target node 20 at all (in other words, when obtaining a determination result indicating that a response cannot be reconstructed from the received response packets), the determining unit 14 determines that any of the packets transmitted as response packets from the survey target node 20 has been discarded. Then, the determining unit 14 causes a message to be displayed via the interface unit 11, the message for notifying that any of the response packets transmitted from the survey target node 20 to the surveying node 10 has been discarded.

That is, the determining unit 14 causes a message to be displayed, the message for notifying that a packet discard has occurred on the route from the survey target node 20 to the surveying node 10.

On the other hand, when obtaining a determination result indicating that all response packets have been received from the survey target node 20 (in other words, when obtaining a determination result indicating that a response can be reconstructed from the received response packets), the determining unit 14 determines that the request packets and the packets transmitted as response packets from the survey target node 20 have not been discarded at all.

Then, the determining unit 14 causes a message to be displayed via the interface unit 11, the message for notifying that the request packets transmitted from the surveying node 10 to the survey target node 20 and the response packets transmitted from the survey target node 20 to the surveying node 10 have not been discarded at all.

That is, the determining unit 14 causes a message to be displayed, the message for notifying that a packet discard has not occurred between the survey target node 20 and the surveying node 10.

(Survey Target Node)

Only when the survey target node 20 can reconstruct a request from each packet received from the surveying node 10 as a request packet, the survey target node 20 returns each packet obtained by dividing each request packet again as a response packet.

Specifically, the survey target node 20 specifies and receives a request packet provided with request-packet identification information from among packets flowing over the network.

When receiving a first request packet, the survey target node 20 obtains a fragment of a message indicative of a request from the request packet, thereby starting reconstruction of a request. Then, every time the survey target node 20 receives a request packet, the survey target node 20 uses the serial number provided to the request packet to connect the fragments of the message, thereby reconstructing a request.

Here, the survey target node 20 determines that a request can be reconstructed (in other words, a command for generating a response packet is issued) only after the survey target node 20 obtains fragments of all messages indicative of request.

Next, the survey target node 20 generates a response having the same data length as that of the request, and divides the response in accordance with the MTU set in advance. For example, when 1000 bytes are set in advance as a MTU and the request having the data length of 14800 bytes has been reconstructed, the survey target node 20 generates a response having a data length of 14800 bytes, and then divides the response into 14 fragments of the response having a data length of 100 bytes and 1 fragment of the response having a data length of 800 bytes.

The survey target node 20 then generates response packets including the respective divided response, provides each response packet with a serial number for use in reconstruction of a response and response-packet identification information, and then transmits the response packets to the surveying node 10.

Process by the Surveying Node

Figure 4:
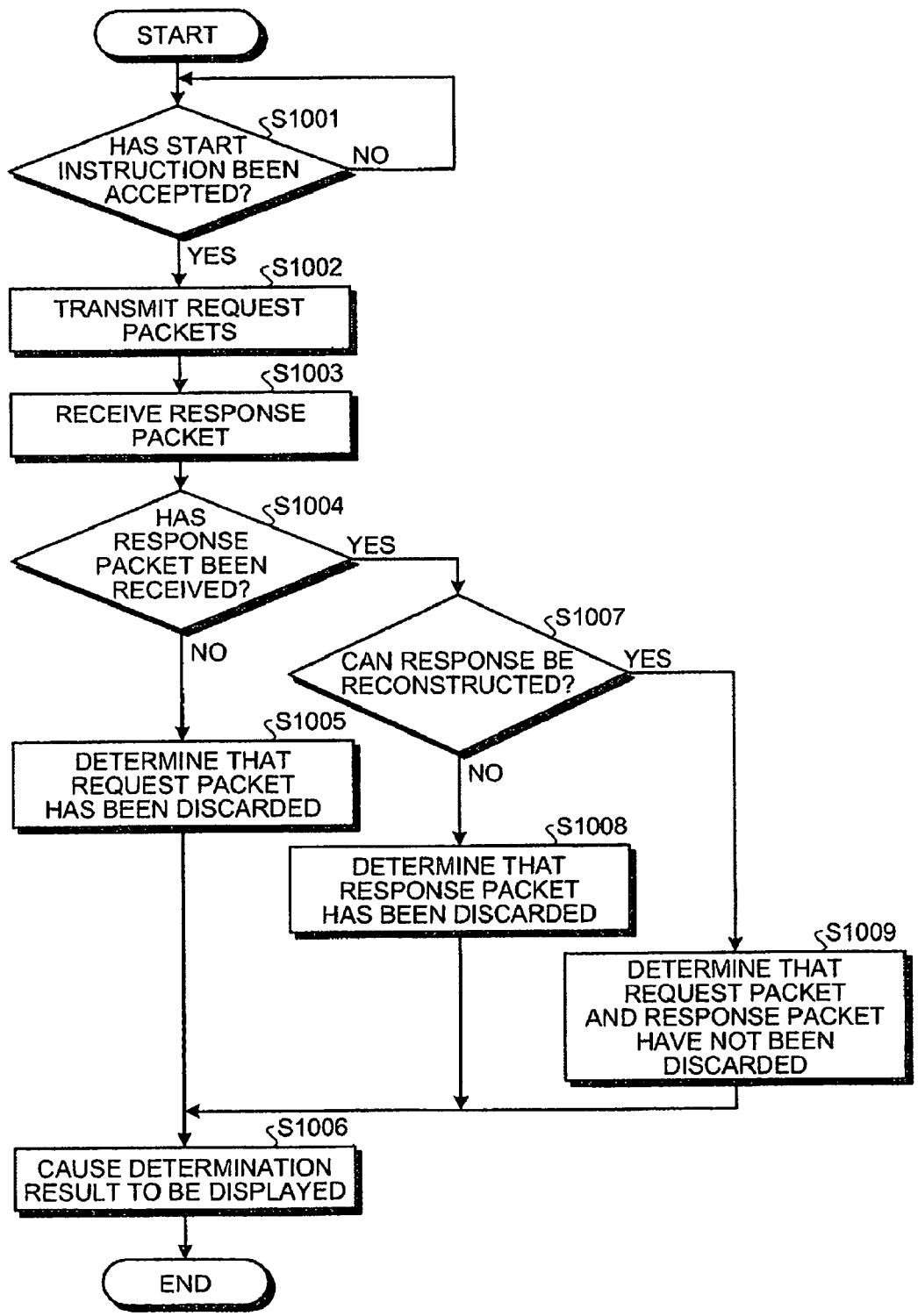
FIG. 4 is a flowchart of a process flow by a surveying node.

Next, the process by the surveying node 10 is explained by using FIG. 4. FIG. 4 is a flowchart of a process flow by the surveying node.

As depicted in FIG. 4, upon accepting a start instruction for surveying a packet discard ("Yes" at step S1001), the surveying node 10 generates and transmits request packets including the respective requests obtained through division (step S1002), and specifies and receives a response packet from among the packets flowing over the network (step S1003).

Then, after a predetermined time has elapsed, the surveying node 10 determines whether one or more response packets have been received from the survey target node 20 (step S1004).

When it is determined that no response packet has been received from the survey target node 20 at all ("No" at step S1004), the surveying node 10 determines that any of the request packets has been discarded (step S1005).

The surveying node 10 then causes a message to be displayed, the message for notifying that a packet discard has occurred on the route from the surveying node 10 to the survey target node 20 (a message for notifying that any of the request packets transmitted from the surveying node 10 to the survey target node 20 has been discarded) (step S1006), and then the process ends.

Returning to the explanation of step S1004, when obtaining a determination result indicating that one or more response packets have been received from the survey target node 20 ("Yes" at step S1004), the surveying node 10 determines whether all response packets have been received from the survey target node 20 (in other words, whether a response can be reconstructed from the received response packets) (step S1007).

When it is determined that a response cannot be reconstructed ("No" at step S1007), the surveying node 10 determines that any of the packets transmitted as response packets from the survey target node 20 has been discarded (step S1008).

The surveying node 10 then causes a message to be displayed, the message for notifying that a packet discard has occurred on the route from the survey target node 20 to the surveying node 10 (a message for notifying that any of the packets transmitted from the survey target node 20 to the surveying node 10 has been discarded) (step S1006), and then the process ends.

Returning to the explanation of step S1007, when obtaining a determination result indicating that a response can be reconstructed ("Yes" at step S1007), the surveying node 10 determines that all packets including the request packets and packets transmitted as response packets from the survey target node 20 have not been discarded at all (step S1009).

The surveying node 10 then causes a message to be displayed, the message for notifying that no packet discard has occurred between the survey target node 20 and the surveying node 10 (a message for notifying that no packets transmitted from the surveying node 10 to the survey target node 20 and no packets transmitted from the survey target node 20 to the surveying node 10 have been discarded at all) (step S1009), and then the process ends.

Effects of the First Embodiment

As explained above, according to the first embodiment, the load on the network administrator can be reduced. For example, according to the detection system in the first embodiment, the load of installing a program for counting the number of reception of request packets and the number of transmission of response packets to the survey target node 20 can be saved. Also, according to the detection system in the first embodiment, the work cost of obtaining the number of reception of request packets and the number of transmission of response packets from the survey target node can be saved.

[b] Second Embodiment

Meanwhile, in the first embodiment, the case of transmitting a request once is explained. Alternatively, a request may be transmitted a plurality of times.

In a second embodiment, a case is explained in which a request formed of request packets is transmitted to the survey target node 20 every time a determination process is performed by the determining unit 14. In the second embodiment, the configuration of a detection system and a process flow by the surveying node 10 according to the second embodiment are explained first, and then effects of the second embodiment is explained.

Configuration of the Detection System According to the Second Embodiment

First, the configuration of the detection system according to the second embodiment is explained. The configuration of the detection system according to the second embodiment is different from the detection system according to the first embodiment in the following points.

That is, every time a determination process is performed by the determining unit 14, the packet transmitting unit 12 transmits a request formed of request packets to the survey target node 20. Specifically, every time a determination process is performed by the determining unit 14, the packet transmitting unit 12 determines whether the number of request transmission indicative of the number of times of transmission of requests reaches a predetermined value set in advance (for example, 100).

Here, when determining that the number of request transmission does not reach the predetermined value set in advance, the packet transmitting unit 12 generates each request packets by dividing a request and transmits the request packets to the survey target node 20, and then adds "1" to the number of request transmission.

On the other hand, when determining that the number of request transmission reaches the predetermined value set in advance, the packet transmitting unit 12 transmits to the determining unit 14 a determination instruction for causing a determination process to be performed.

When it is determined that any of the packets transmitted as a response from the survey target node 20 has been discarded and that any of the packets transmitted to the survey target node 20 as a request has been discarded, the determining unit 14 performs a determination process of determining that a packet transmitted to the survey target node 20 as a request and a packet transmitted from the survey target node 20 as a response has been discarded.

Specifically, when a time set in advance has elapsed, the determining unit 14 determines whether a response packet has been received from the survey target node 20. When obtaining a determination result indicating that no response packet has been received from the survey target node 20 at all, the determining unit 14 adds "1" to "the number of times of discard of request itself" indicative of the number of times of determination that any of the request packets has been discarded.

When obtaining a determination result indicating that one or more response packets have been received from the survey target node 20, the determining unit 14 determines whether all response packets have been received from the survey target node 20.

When obtaining a determination result indicating that not all response packets have been received, the determining unit 14 adds "1" to "the number of times of discard of response itself" indicative of the number of times of determination that any of the response packets has been discarded.

When obtaining a determination result indicating that all response packets have been received from the survey target node 20, the determining unit 14 adds nothing to either of the numbers of times of discard.

When accepting a determination instruction from the packet transmitting unit 12, the determining unit 14 performs a determination process. Specifically, when accepting a determination instruction from the packet transmitting unit 12, the determining unit 14 determines whether "the number of times of discard of request itself" is equal to or greater than "1".

When determining that "the number of times of discard of request itself" is equal to or greater than "1", the determining unit 14 further determines whether "the number of times of discard of response itself" is equal to or greater than "1". When determining that "the number of times of discard of response itself" is equal to or greater than "1", the determining unit 14 determines that a packet transmitted to the survey target node 20 as a request packet and a packet transmitted from the survey target node 20 as a response packet have been discarded.

The determining unit 14 then causes a message to be displayed via the interface unit 11, the message for notifying that any of the packets transmitted from the surveying node 10 to the survey target node 20 has been discarded and, furthermore, any of the packets transmitted from the survey target node 20 to the surveying node 10 has been discarded.

That is, the determining unit 14 causes a message to be displayed, the message for notifying that a packet discard has occurred on the route from the surveying node 10 to the survey target node 20 and on the route from the survey target node 20 to the surveying node 10.

On the other hand, when determining that "the number of times of discard of response itself" is "0", the determining unit 14 determines that any of the request packets has been discarded. The determining unit 14 then causes a message to be displayed via the interface unit 11, the message for notifying that any of the packets transmitted from the surveying node 10 to the survey target node 20 has been discarded.

That is, the determining unit 14 causes a message to be displayed, the message for notifying that a packet discard has occurred on the route from the surveying node 10 to the survey target node 20.

When determining that "the number of times of discard of request itself" is "0", the determining unit 14 further determines whether "the number of times of discard of response itself" is equal to or greater than "1". When determining that "the number of times of discard of response itself" is equal to or greater than "1", the determining unit 14 determines that any of the packets transmitted from the survey target node 20 as response packets has been discarded.

The determining unit 14 then causes a message to be displayed via the interface unit 11, the message for notifying that any of the packets transmitted from the survey target node 20 to the surveying node 10 has been discarded.

That is, the determining unit 14 causes a message to be displayed, the message for notifying that a packet discard has occurred on the route from the survey target node 20 to the surveying node 10.

On the other hand, when determining that "the number of times of discard of response itself" is "0", the determining unit 14 determines that the request packets and the packets transmitted from the survey target node 20 as response packets have not been discarded at all.

The determining unit 14 then causes a message to be displayed via the interface unit 11, the message for notifying that the packets transmitted from the surveying node 10 to the survey target node 20 and the packets transmitted from the survey target node 20 to the surveying node 10 have not been discarded at all.

That is, the determining unit 14 causes a message to be displayed, the message for notifying that a packet discard between the survey target node 20 and the surveying node 10 has not occurred.

Process by the Surveying Node According to the Second Embodiment

Figure 5:
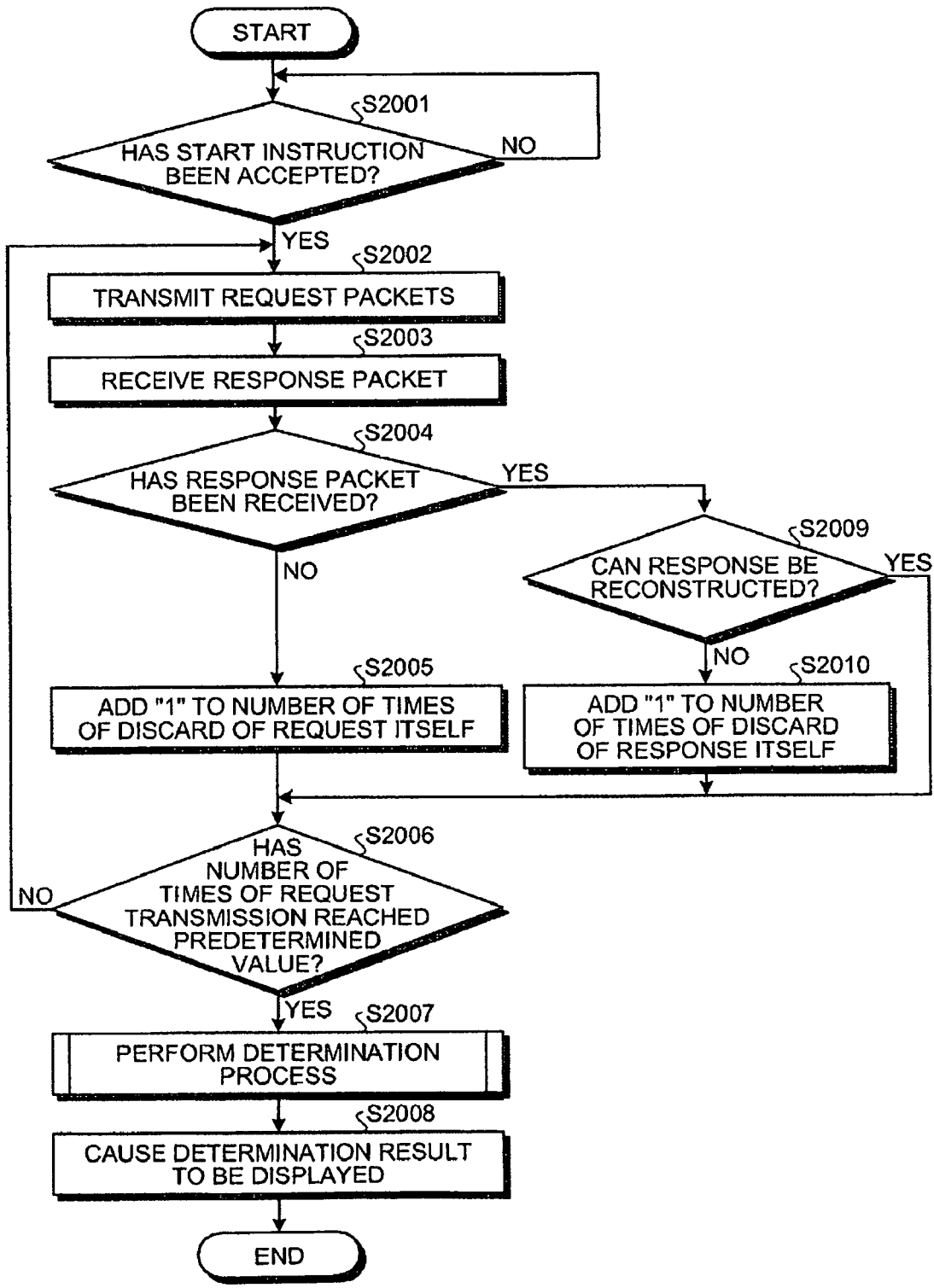
FIG. 5 is a flowchart of a process flow of a surveying node according to a second embodiment.
Figure 6:
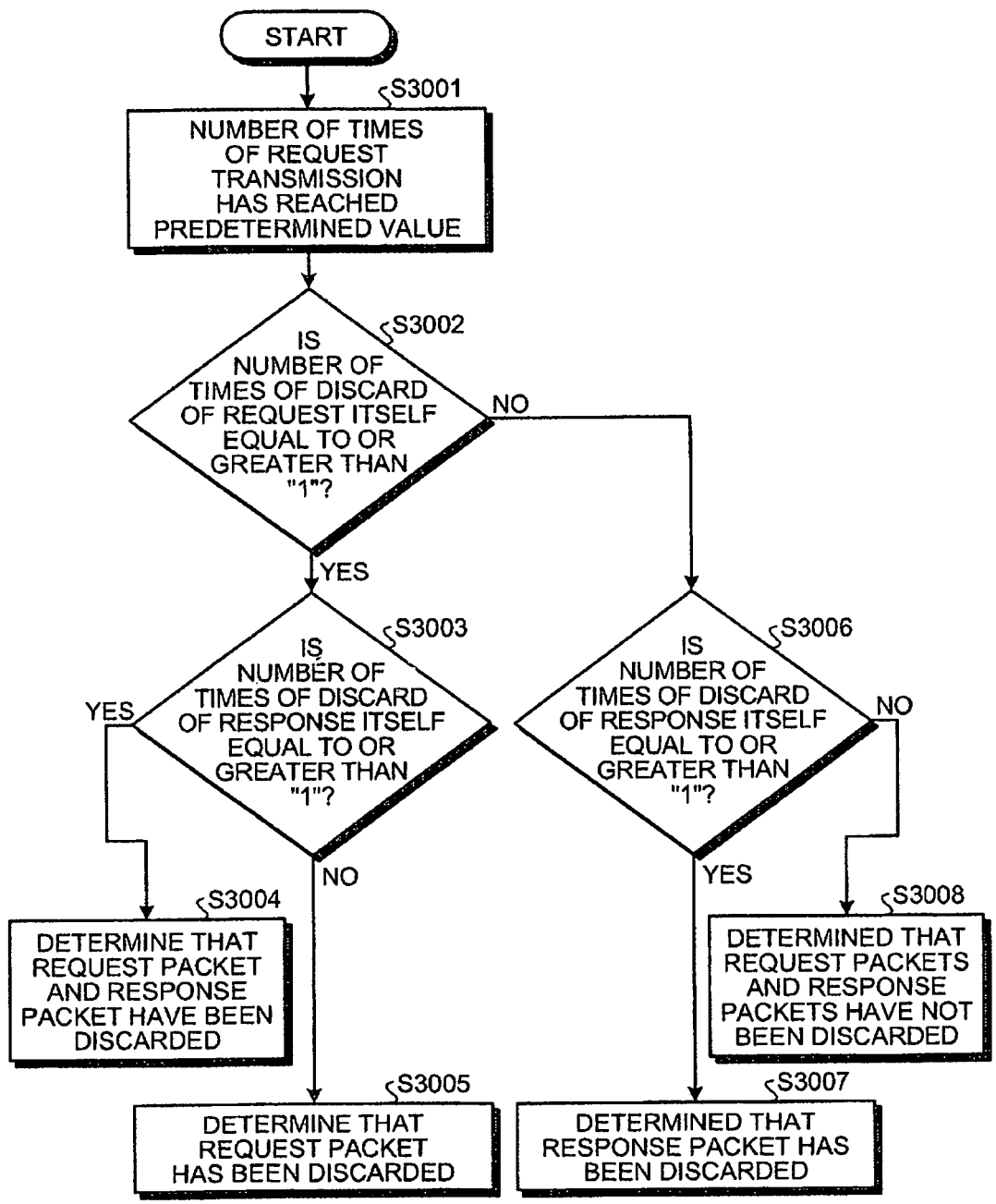
FIG. 6 is a flowchart of a process flow of a determination process by the surveying node according to the second embodiment.

Next, the process by the surveying node according to the second embodiment is explained by using FIGS. 5 and 6. FIG. 5 is a flowchart of a process flow of the surveying node according to the second embodiment. FIG. 6 is a flowchart of a process flow of a determination process by the surveying node according to the second embodiment. In the following, only the points different from those in the process by the surveying node 10 according to the first embodiment are explained in detail.

As depicted in FIG. 5, when obtaining a determination result indicating that a response packet has not been received from the survey target node 20 ("No" at step S2004), the surveying node 10 adds "1" to "the number of times of discard of request itself" (step S2005), and then determines whether the number of times of request transmission has reached a predetermined value set in advance (step S2006).

When determining that the number of times of request transmission has not reached the predetermined value set in advance ("No" at step S2006), the surveying node 10 generates request packets again for transmission (step S2002).

On the other hand, when determining that the number of times of request transmission has reached the predetermined value set in advance ("Yes" at step S2006), the surveying node 10 performs a determination process (step S2007), causes a determination result to be displayed (step S2008), and then ends the process.

Returning to the explanation of step S2004, when obtaining a determination result indicating that a response packet has been received from the survey target node 20 ("Yes" at step S2004), the surveying node 10 further determines whether a response can be reconstructed (step S2009).

When obtaining a determination result indicating that a response cannot be reconstructed ("No" at step S2009) the surveying node 10 adds "1" to "the number of times of discard of response itself" (step S2010), and then determines whether the number of times of request transmission has reached the predetermined value set in advance (step S2006).

On the other hand, when obtaining a determination result indicating that a response can be reconstructed ("Yes" at step S2009), the surveying node 10 further determines whether the number of times of request transmission has reached the predetermined value set in advance (step S2006).

As depicted in FIG. 6, when determining that the number of times of request transmission has reached the predetermined value set in advance (step S3001), the surveying node 10 further determines whether "the number of times of discard of request itself" is equal to or greater than "1" (step S3002).

When determining that "the number of times of request itself" is equal to or greater than "1" ("Yes" at step S3002), the surveying node 10 further determines whether "the number of times of discard of response itself" is equal to or greater than "1" (step S3003).

When determining that "the number of times of discard of response itself" is equal to or greater than "1" ("Yes" at step S3003), the surveying node 10 determines that a request packet and a response packet have been discarded (step S3004).

On the other hand, when determining that "the number of times of discard of response itself" is "0" ("No" at step S3003), the surveying node 10 determines that any of the request packets has been discarded (step S3005).

Returning to the explanation of step S3002, when determining that "the number of times of discard of request itself" is "0" ("No" at step S3002), the surveying node 10 further determines whether "the number of times of discard of response itself" is equal to or greater than "1" (step S3006).

When determining that "the number of times of discard of response itself" is equal to or greater than "1" ("Yes" at step S3006), the surveying node 10 determines that any of the response packets has been discarded (step S3007).

On the other hand, when determining that "the number of times of discard of response itself" is "0" ("No" at step S3006), the surveying node 10 determines that the request packets and the response packets have not been discarded at all (step S3008).

Effects of the Second Embodiment

As explained above, according to the second embodiment, it is possible to detect that any of the packets transmitted from the surveying node 10 to the survey target node 20 has been discarded and further detect that any of the packets transmitted from the survey target node 20 to the surveying node 10 has been discarded.

Also, according to the second embodiment, a packet discard can be accurately detected for each route.

[c] Third Embodiment

Meanwhile, in the second embodiment, the case of counting the number of times of request transmission and "the number of times of discard of request itself" has been explained.

Here, the possibility of discarding each packet transmitted from the surveying node 10 to the survey target node 20 before the packet reaches the survey target node 20 can be calculated as an expected value "α", based on the number of times of request transmission "S", "the number of times of discard of request itself "a"", and the request division number "N" indicating the number of request packets generated by dividing a request.

In the third embodiment, a case is explained in which the possibility of discarding each packet transmitted from the surveying node 10 to the survey target node 20 before the packet reaches the survey target node 20 is calculated as an expected value based on the number of times of request transmission, "the number of times of discard of request itself", and the request division number.

In the third embodiment, the configuration of a detection system according to the third embodiment and a process flow by an expected-value calculating unit are explained first, and then effects of the third embodiment are explained.

Configuration of the Detection System According to the Third Embodiment

Figures 7, 8:
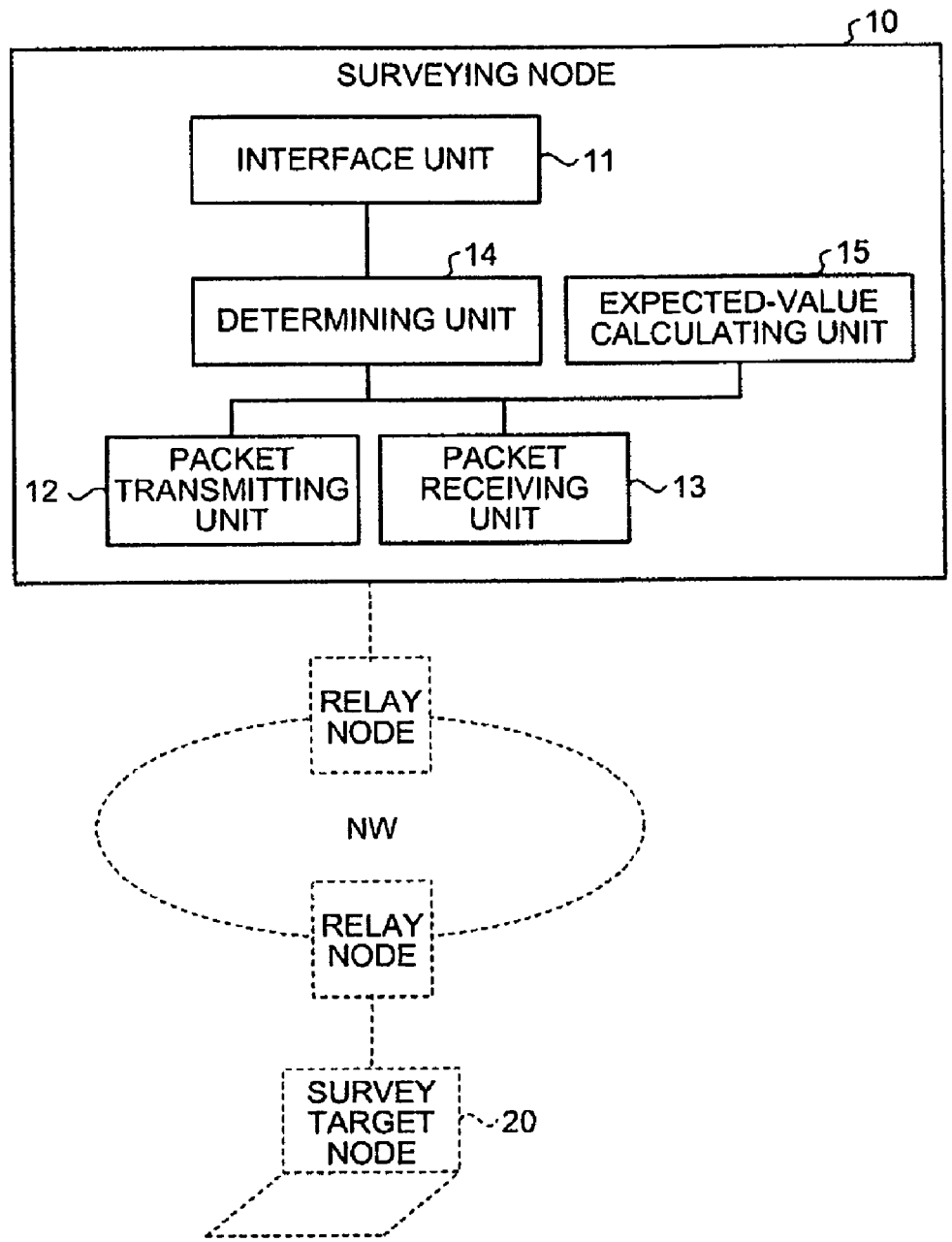
FIG. 7 is a black diagram of the configuration of the detection system according to the third embodiment.
FIG. 8 depicts an equation for calculating an expected value.

The configuration of the detection system according to the third embodiment is different from the detection system according to the second embodiment in that an expected-value calculating unit 15 is newly provided, as depicted in FIG. 7. FIG. 7 is a block diagram of the configuration of the detection system according to the third embodiment.

That is, the expected-value calculating unit 15 calculates an expected value represented as a numerical value indicative of the possibility of discarding each packet transmitted from the surveying node 10 to the survey target node 20 before the packet reaches the survey target node 20, based on the number of times of request transmission, "the number of times of discard of request itself", and the request division number.

Specifically, the expected-value calculating unit 15 calculates an expected value by using Equation 1 depicted in FIG. 8, where "S" corresponds to the number of times of request transmission, "a" corresponds to "the number of times of discard of request itself", "N" corresponds to the request division number, and "α" corresponds to an expected value. FIG. 8 depicts an equation for calculating an expected value.

Here, Equation 1 depicted in FIG. 8 is briefly explained. Since a probability of not discarding a request packet is "1−α" and a probability of not discarding all N request packets is "$(1-\alpha)^N$", a probability of discarding the request itself (in other words, a probability of the survey target node 20 not reconstructing a request transmitted from the surveying node 10 or a rate of discard of request itself) is "$1-(1-\alpha)^N$", which is equal to a probability of discarding any of N request packets. Since the rate of discard of request itself can also be represented as "a/S", from an equation of "$1-(1-\alpha)^N=a/S$", an expected value can be calculated as depicted in FIG. 8.

[Process by the Expected-value Calculating Unit]

Next, an example of a process flow by the expected-value calculating unit 15 is explained. FIG. 9 is a flowchart of a process flow by the expected-value calculating unit 15.

As depicted in FIG. 9, when accepting from the interface unit 11 a start instruction including the number of times of request transmission and "the number of times of discard of request itself" ("Yes" at step S4001), the expected-value calculating unit 15 waits until the determination result is displayed ("No" at step S4002).

Then, when the determination result is displayed ("Yes" at step S4002), the expected-value calculating unit 15 calculates an expected value (step S4003), and then ends the process.

Effects of the Third Embodiment

As explained above, according to the third embodiment, it is possible to calculate, as an expected value, the possibility of discarding each packet transmitted from the surveying node 10 to the survey target node 20 before the packet reaches the survey target node 20, based on the number of times of request transmission, "the number of times of discard of request itself", and the request division number.

[d] Fourth Embodiment

Meanwhile, in the third embodiment, the case of calculating an expected value has been explained. Alternatively, a possibility of discarding each packet transmitted from the surveying node 10 to the survey target node 20 before the packet reaches the survey target node 20 (a discard rate of upstream-packet "α") may be calculated as an expected range based on the number of times of request transmission "S", "the number of times of discard of request itself "a"", and the request division number "N".

In a fourth embodiment, a case is explained in which a possibility of discarding each packet transmitted from the surveying node 10 to the survey target node 20 before the packet reaches the survey target node 20 is calculated as an expected range based on the number of times of request transmission, the number of times of discard of request itself, and the request division number. In the fourth embodiment, the configuration of a detection system according to the fourth embodiment and effects of the fourth embodiment are explained.

Configuration of the Detection System According to the Fourth Embodiment

The configuration of the detection system according to the fourth embodiment is different from the detection system according to the second embodiment in that an expected-range calculating unit 16 is newly provided, as depicted in FIG. 10. FIG. 10 is a block diagram of the configuration of the detection system according to the fourth embodiment.

That is, the expected-range calculating unit 16 calculates a discard rate of upstream-packet as an expected range, based on the number of times of request transmission, "the number of times of discard of request itself", and the request division number.

Specifically, the expected-range calculating unit 16 calculates an expected range by using Equation 2 depicted in FIG. 11, where "S" corresponds to the number of times of request transmission, "a" corresponds to "the number of times of discard of request itself", "N" corresponds to the request division number, "α" corresponds to a discard rate of upstream-packet and "*" represents a multiplication sign. FIG. 11 depicts an equation for calculating an expected range.

Here, Equation 2 depicted in FIG. 11 is briefly explained. From the number of times of discard of request itself "a", the number of discarded request packets can be "a" when one packet is discarded for each request with the number of entirely-discarded requests a to "a*N" when N packets are discarded for each request.

In other words, it is assume that the number of times of discard of request itself is "a" after a request formed of N request packets is transmitted from the surveying node 10 a plurality of number of times. At this time, "the number of discarded request packets" indicative of the number of request packets not reaching from the surveying node 10 to the survey target node 20 can be predicted as being equal to or greater than "a" and equal to or smaller than "a*N".

From this, the discard rate of upstream packet can be calculated as an expected range (a range in which the discard rate of upstream packet can take) by dividing the number of discarded request packets by the total number of request packets "S*N" and from an inequality "a/(S*N)≦α≦a/S", as depicted in FIG. 11.

Effects of the Fourth Embodiment

As explained above, according to the fourth embodiment, it is possible to calculate, as an expected range, the possibility of discarding each packet transmitted from the surveying node 10 to the survey target node 20 before the packet reaches the survey target node 20, based on the number of times of request transmission, "the number of times of discard of request itself", and the request division number.

[e] Fifth Embodiment

Meanwhile, in the fourth embodiment, the case of calculating an expected range has been explained. Alternatively, a discard rate represented as a numerical value indicative of the possibility of discarding each packet transmitted from the survey target node 20 to the surveying node 10 before the packet reaches the surveying node 10 (a discard rate of downstream packet) may be calculated based on the number of times of request transmission "S", "the number of times of discard of request itself "a"", the response division number "N'", and the number of discarded response packets "b" indicative of the number of packets not received from the survey target node 20.

In a fifth embodiment, a case is explained in which a discard rate of downstream packet is calculated based on the number of times of request transmission, the number of times of discard of request itself, the response division number, and the number of discarded response packets. Here, in the fifth embodiment, the configuration of a detection system according to the fifth embodiment and a process flow of the surveying node 10 are explained first, and then effects of the fifth embodiment are explained.

Configuration of the Detection System According to the Fifth Embodiment

Figures 12, 13:
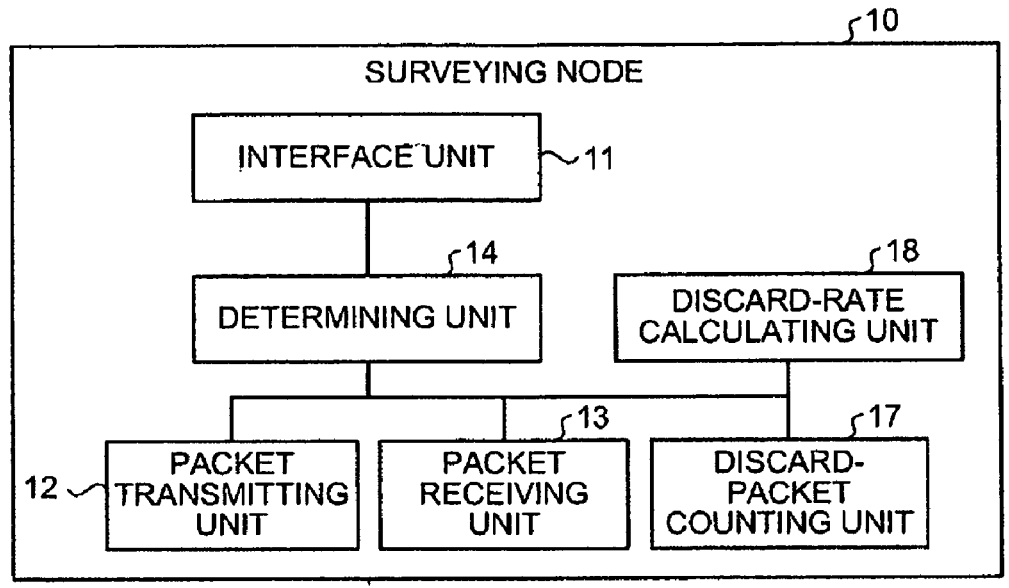
FIG. 12 is a block diagram of the configuration of the detection system according to the fifth embodiment.
FIG. 13 depicts an equation for calculating a discard rate.

The configuration of the detection system according to the fifth embodiment is different from the detection system according to the second embodiment in that a discard-packet counting unit 17 and a discard-rate calculating unit 18 are newly provided, as depicted in FIG. 12. FIG. 12 is a block diagram of the configuration of the detection system according to the fifth embodiment.

That is, the discard-packet counting unit 17 counts the number of discarded response packets indicative of the number of packets not received as response packets from the survey target node. Specifically, when a first response packet is received from among response packets generated by dividing a response by the survey target node 20, the discard-packet counting unit 17 extracts a message length of a response fragment included in the response packet.

The discard-packet counting unit 17 then rounds up the decimals of a division value obtained by dividing the entire message length of the request by the extracted message length of the response fragment, thereby calculating the response division number indicative of the number of response packets generated by dividing a response.

When the determining unit 14 determines that a determination result indicating that not all response packets have been received, the number of reception of response packets is subtracted from the response division number to calculate a difference value.

Then, the discard-packet counting unit 17 adds the calculated difference value to the number of discarded response packets indicative of the number of packets not received as response packets from the survey target node to calculate the number of discarded response packets.

The discard-packet counting unit 17 calculates a discard rate of downstream packet based on the number of times of request transmission, "the number of times of discard of request itself", the response division number, and the number of discarded response packets.

Specifically, the discard-packet counting unit 17 calculates a discard rate of downstream packet by using Equation 3 depicted in FIG. 13, where "S" corresponds to the number of times of request transmission, "a" corresponds to "the number of times of discard of request itself", "b" corresponds to the number of discarded response packets, "N'" corresponds to the response division number, "β" corresponds to a discard rate of downstream packet, and "*" represents a multiplication sign. FIG. 13 depicts an equation for calculating a discard rate.

Here, Equation 3 depicted in FIG. 13 is briefly explained. Since the number of requests reaching the survey target node 20 is "S−a" and the survey target node 20 returns N' response packets when a request is reconstructed, the total number of response packets is represented by "(S−a)*N'". The discard rate of downstream packet can be uniquely calculated as depicted in FIG. 13 by dividing the number of discarded response packets "b" by the total number of response packets with an equation "β=b/{(S−a)*N'}".

Process by the Surveying Node According to the Fifth Embodiment

Figure 14:
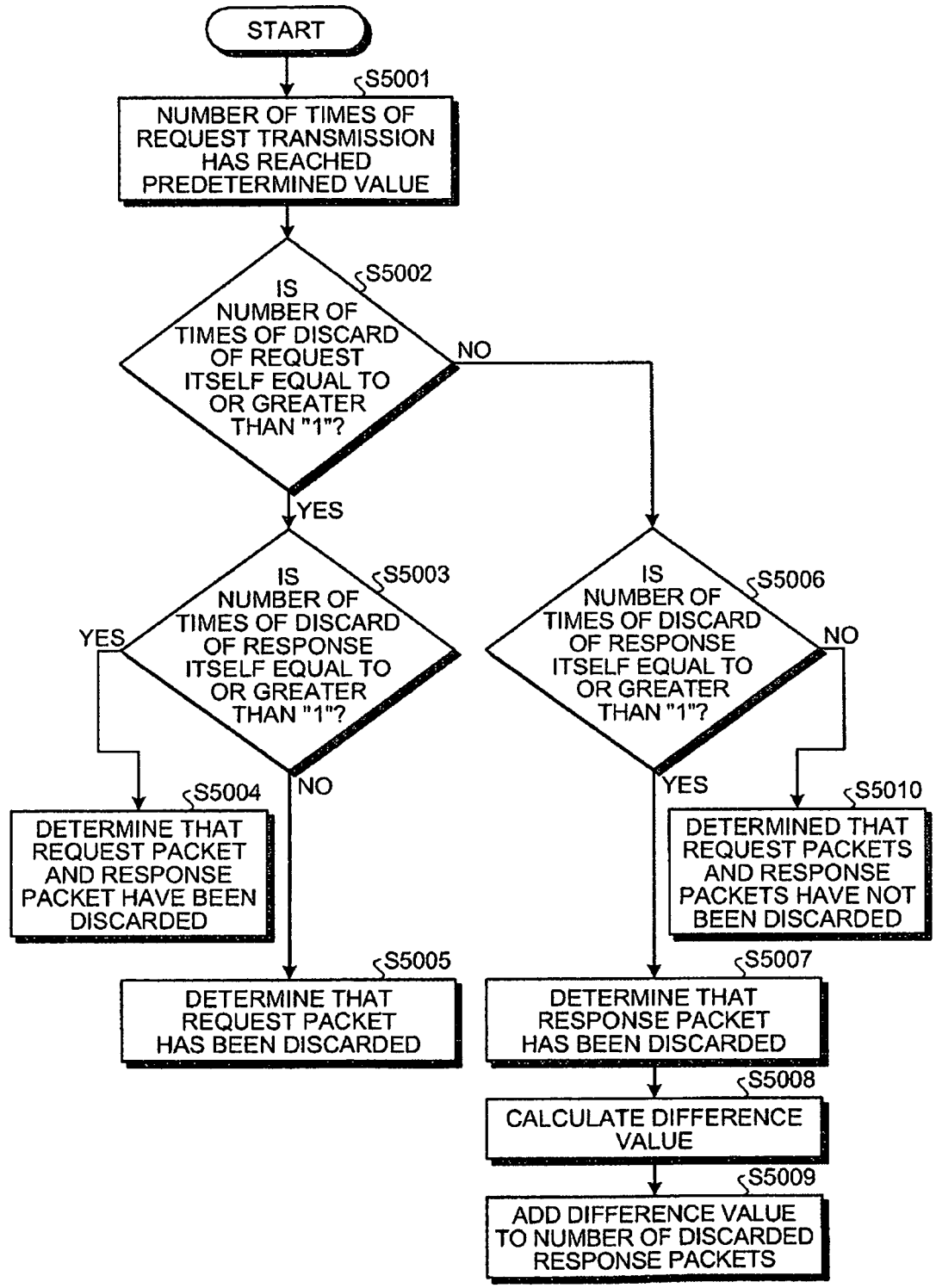
FIG. 14 is a flowchart of a process of a determination process by a surveying node according to a fifth embodiment.

Next, a process by the surveying node 10 according to the fifth embodiment is explained by using FIG. 14. FIG. 14 is a flowchart of a process of a determination process by the surveying node according to the fifth embodiment. In the following, only the points different from the process by the surveying node according to the second embodiment are explained in detail.

As depicted in FIG. 14, when determining that the number of times of discard of request itself is "0" ("No" at step S5002) and "the number of times of discard of response itself is equal to or greater than "1" ("Yes" at step S5006), the surveying node 10 determines that any of the packets transmitted from the survey target node 20 as response packets has been discarded (step S5007).

Then, the surveying node 10 subtracts the number of reception of response packets from the response division number to calculate a difference value (step S5008), and adds the calculated difference value to the number of discarded response packets (step S5009).

Effects of the Fifth Embodiment

As explained above, according to the fifth embodiment, a discard rate representing, as a numerical value, the possibility of discarding each packet transmitted from the survey target node 20 to the surveying node 10 before the packet reaches the surveying node 10 can be calculated based on the number of times of request transmission, the number of times of discard of request itself, the response division number, and the number of discarded response packets.

[f] Sixth Embodiment

Meanwhile, the present invention can be applied to even a case of transmitting a request by the surveying node 10 to each of a plurality of survey target nodes 20. In a sixth embodiment, the case of transmitting a request from the surveying node 10 to each of a plurality of the survey target nodes 20 is explained. In the sixth embodiment, the configuration of a detection system according to the sixth embodiment and a process flow by the surveying node 10 are explained first, and then effects of the sixth embodiment are explained.

Configuration of the Detection System According to the Sixth Embodiment

Figure 15:
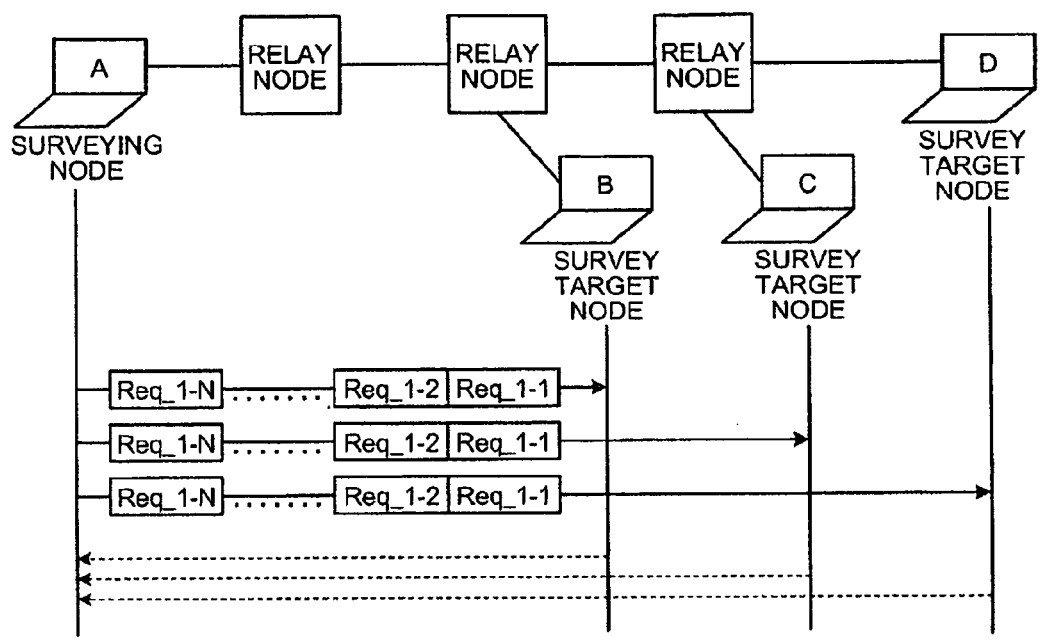
FIG. 15 is a drawing for explaining a process by a detection system according to a sixth embodiment.

The configuration of the detection system according to the sixth embodiment is explained first by using FIG. 15. FIG. 15 is a drawing for explaining a process by the detection system according to the sixth embodiment. The configuration of the detection system according to the sixth embodiment is different from that of the detection system according to the first embodiment in the following points.

That is, the packet transmitting unit 12 transmits a request to each of the survey target nodes 20. Specifically, the packet transmitting unit 12 accepts, via the interface unit 11, pieces of address information for identifying the survey target nodes 20 as destinations of transmission of request packets.

Then, the packet transmitting unit 12 divides a request for each piece of address information and generates request packets each including a request obtained through division, a serial number, request packet information, and address information of the survey target node 20 as a destination for transmission of the request.

The packet transmitting unit 12 then uses the address information included in the generated request packets to transmit the request packets to each of the survey target nodes 20 (refer to FIG. 15).

The packet receiving unit 13 specifies and receives a response packet including response-packet identification information from among packets flowing over the network, and extracts the address information included in the response packet.

The packet receiving unit 13 then pieces together fragments of message indicative of a response for each extracted address information, thereby reconstructing a response from the response packets.

The determining unit 14 performs a determination process for each survey target node 20. Specifically, the determining unit 14 counts the number of transmission of request packets by relating the same to the address information. Also, the determining unit 14 counts the number of reception of response packets by relating the same to the address information. The determining unit 14 then performs a determination process for each survey target node 20.

Process by the Surveying Node According to the Sixth Embodiment

Figure 16:
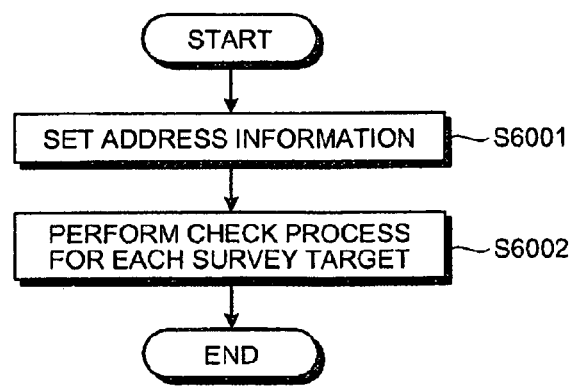
FIG. 16 is a flowchart of a process flow of a surveying node according to the sixth embodiment.

Next, a process by the surveying node 10 according to the sixth embodiment is explained by using FIG. 16. FIG. 16 is a flowchart of a process flow of the surveying node according to the sixth embodiment.

As depicted in FIG. 16, when address information for identifying the survey target nodes 20 as destinations of transmission of request packets are set in the surveying node 10 (step S6001), the surveying node 10 uses the number of transmission of request packets counted in association with the address information, and the number of reception of response packets to perform a check process for each survey target node 20 (step S6002).

Effects of the Sixth Embodiment

As explained above, according to the sixth embodiment, a packet discard for each route can be detected for the survey target nodes 20.

[g] Seventh Embodiment

By using the detection system explained in the sixth embodiment, a packet discard for each route can be detected at predetermined time intervals.

In a seventh embodiment, a case of the surveying node 10 transmitting a request at predetermined time intervals is explained. In the seventh embodiment, the configuration of a detection system and a process flow of the surveying node according to the seventh embodiment are explained first, and then effects of the seventh embodiment are explained.

Configuration of the Detection System According to the Seventh Embodiment

The configuration of the detection system according to the seventh embodiment is explained first. The detection system according to the seventh embodiment is different from the detection system according to the sixth embodiment in the following points.

That is, the packet transmitting unit 12 transmits a request every time a post-transmission elapse counter value indicative of an elapsed time after a request is divided and the divided request packets are transmitted reaches a predetermined value set in advance.

Specifically, for example, the packet transmitting unit 12 accepts via the interface unit 11 a measurement cycle (for example, 300) indicative of a cycle of transmitting a request. The packet transmitting unit 12 then divides a request to generate request packets, and transmits the generated request packets to each of the survey target nodes 20.

When the post-transmission elapse counter value reaches the set value of the measurement cycle, the packet transmitting unit 12 again divides the request to generate request packets, and transmits the generated request packets to each of the survey target nodes 20.

Process by the Surveying Node According to the Seventh Embodiment

Figure 17:
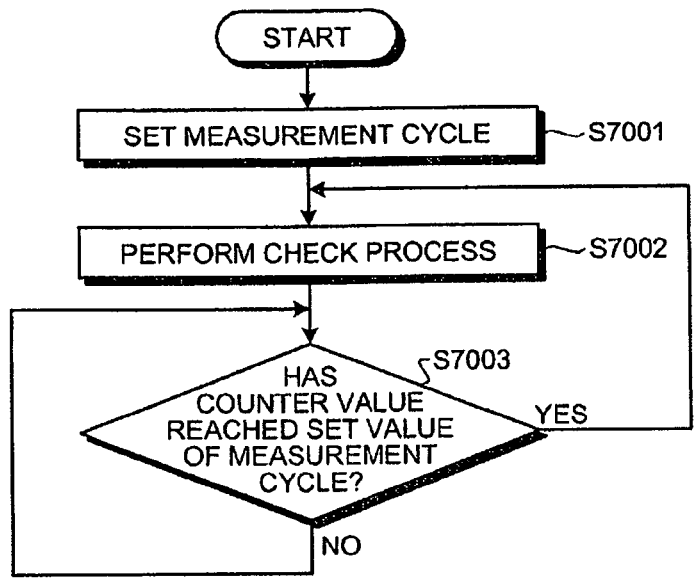
FIG. 17 is a flowchart of a process flow of a surveying node according to a seventh embodiment.

Next, the process by the surveying node 10 according to the seventh embodiment is explained by using FIG. 17. FIG. 17 is a flowchart of a process flow of the surveying node according to the seventh embodiment.

As depicted in FIG. 17, when a measurement cycle indicative of a cycle of transmitting a request is set (step S7001), the surveying node 10 transmits the request packets to each of the survey target nodes 20, and performs a check process for each survey target node 20 (step S7002).

The surveying node 10 waits until the post-transmission elapse counter value reaches the set value of the measurement cycle ("No" at step S7003). When the post-transmission elapse counter value reaches the set value of the measurement cycle ("Yes" at step S7003), the surveying node 10 again transmits the request packets to each of the survey target nodes 20, and performs a check process for each survey target node 20 (step S7002).

Effects of the Seventh Embodiment

As explained above, according to the seventh embodiment, a packet discard for each route can be regularly checked.

[h] Eighth Embodiment

Meanwhile, for example, a request packet or response packet may be discarded because the size of data included in the request packet or response packet is larger than the size of data that can be relayed by a relay node.

As a result, an erroneous discard determination result may be obtained. Also, an error may occur in the expected value, the expected range, and the discard rate of downstream packet. To get around this, in an eighth embodiment, a case is explained in which a test of determining whether the survey target node 20 is eligible for checking a packet discard for each route is performed. In the eighth embodiment, the configuration of a detection system and a process flow by the surveying node according to the eighth embodiment are explained first, and then effects of the eighth embodiment are explained.

Configuration of the Detection System According to the Eighth Embodiment

The configuration of the detection system according to the eighth embodiment is explained first. The configuration of the detection system according to the eighth embodiment is different from that of the detection system according to the second embodiment in the following points.

When the packet transmitting unit 12 accepts the number of times of test transmission (for example, 10) indicative of the number of times of transmitting a request as a test via the interface unit 11, the packet transmitting unit 12 transmits a request until the number of times of request transmission reaches the number of times of test transmission.

When the number of times of request transmission reaches a predetermined number of times set in advance, the determining unit 14 determines whether the number of times of request transmission and "the number of times of discard of request itself" match.

When obtaining a determination result indicating that the number of times of request transmission and "the number of times of discard of request itself" match, the determining unit 14 determines the survey target node 20 as not eligible as a target for checking a packet discard for each route.

On the other hand, when obtaining a determination result indicating that the number of times of request transmission and "the number of times of discard of request itself" do not match, the determining unit 14 determines the survey target node 20 as eligible as a target for checking a packet discard for each route.

The surveying node 10 may determine for each survey target node 20 whether the node is eligible as a target for checking a packet discard for each route, or may determine for a plurality of survey target nodes 20 all at once whether these nodes are eligible as targets for checking a packet discard for each route.

Process by the Surveying Node According to the Eighth Embodiment

Figure 18:
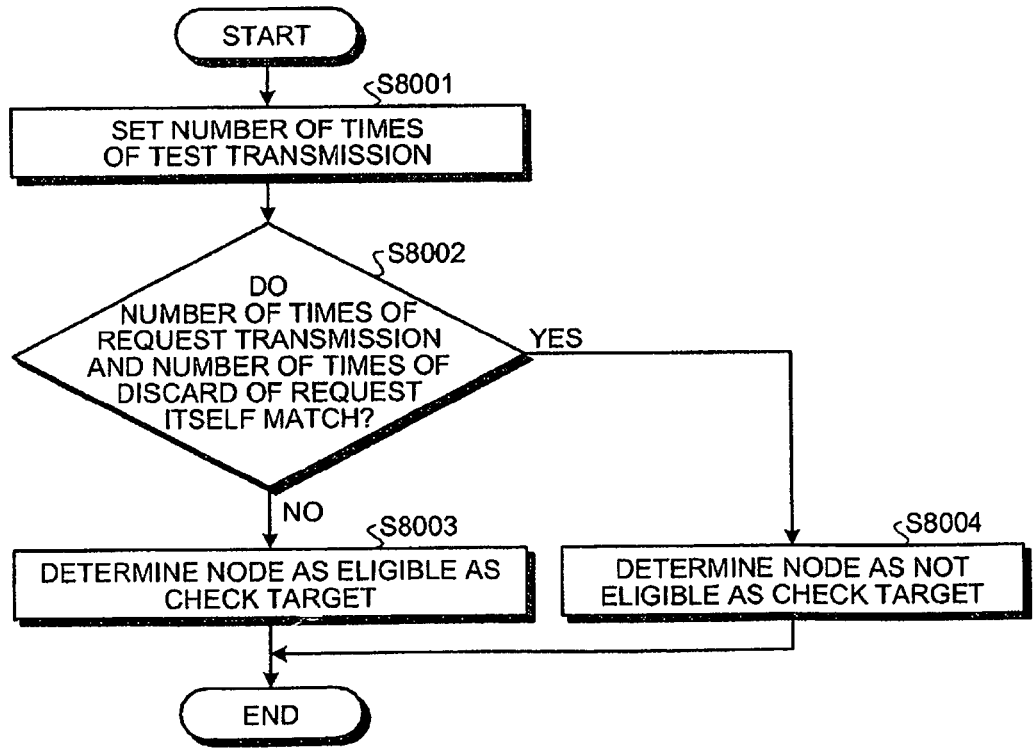
FIG. 18 is a flowchart of a process flow of a surveying node according to an eighth embodiment.

Next, the process by the surveying node 10 according to the eighth embodiment is explained by using FIG. 18. FIG. 18 is a flowchart of a process flow of the surveying node according to the eighth embodiment.

As depicted in FIG. 18, when the number of times of test transmission is set (step S8001), the surveying node 10 performs a check process until the number of times of request transmission reaches the number of times of test transmission, determining whether the number of times of request transmission and "the number of times of discard of request itself" match (step S8002).

When obtaining a determination result indicating that the number of times of request transmission and "the number of times of discard of request itself" match ("Yes" at step S8002), the surveying node 10 determines the survey target node 20 as not eligible as a target for checking a packet discard for each route (step S8004).

On the other hand, when obtaining a determination result indicating that the number of times of request transmission and "the number of times of discard of request itself" do not match ("No" at step S8002), the surveying node 10 determines the survey target node 20 as eligible as a target for checking a packet discard for each route (step S8003).

Effects of the Eighth Embodiment

As explained above, according to the eighth embodiment, a survey target node 20 eligible as a target for checking a packet discard for each route can be determined.

[i] Ninth Embodiment

Meanwhile, for example, a buffer overflow may occur in a relay node connected between the surveying node 10 and the survey target node 20 to cause any of the request packets to be discarded.

At this time, in the detection system according to the eighth embodiment, the survey target node 20 as a test target is determined as not eligible. However, by decreasing a request size, which is a message length of a request, a buffer overflow at the relay node can be prevented.

In a ninth embodiment, a case of decreasing the request size is explained. In the ninth embodiment, the configuration of a detection system and a process flow of the detection system according to the ninth embodiment are explained first, and then effects of the ninth embodiment are explained.

Configuration of the Detection System According to the Ninth Embodiment

The configuration of the detection system according to the ninth embodiment is explained first. The configuration of the detection system according to the ninth embodiment is different from that of the detection system according to the eighth embodiment in the following points.

That is, when obtaining a determination result indicating that the number of times of request transmission and "the number of times of discard of request itself" match, the packet transmitting unit 12 subtracts a size-gap length from the request size of a request, thereby changing the size of the request to be transmitted.

Specifically, for example, it is assumed in the packet transmitting unit 12 that 30,000 bytes are set in advance as an initial request size (L_init) and 1,000 bytes are set in advance as a size-gap length (L_gap). Also, it is assumed in the packet transmitting unit 12 that 1,000 bytes are set as an MTU.

When accepting the number of times of test transmission (S_prep: for example, 10) via the interface unit 11, the packet transmitting unit 12 divides a request having a data length of 30,000 bytes, for example, into 30 for transmission to a survey target node 20 ten times.

Then, when the determining unit 14 determines that the survey target node 20 is not eligible for checking a packet discard for each route, the packet transmitting unit 12 subtracts the size-gap length from the initial request size to change the request size to 29,000 bytes (L=L−L_gap).

Here, the packet transmitting unit 12 determines whether the request size after change is effective (L>0). When determining that the request size after change is effective, the packet transmitting unit 12 divides the request having the data length of 29,000 bytes into 29 for transmission to the survey target node 20 ten times.

Process by the Surveying Node According to the Ninth Embodiment

Figure 19:
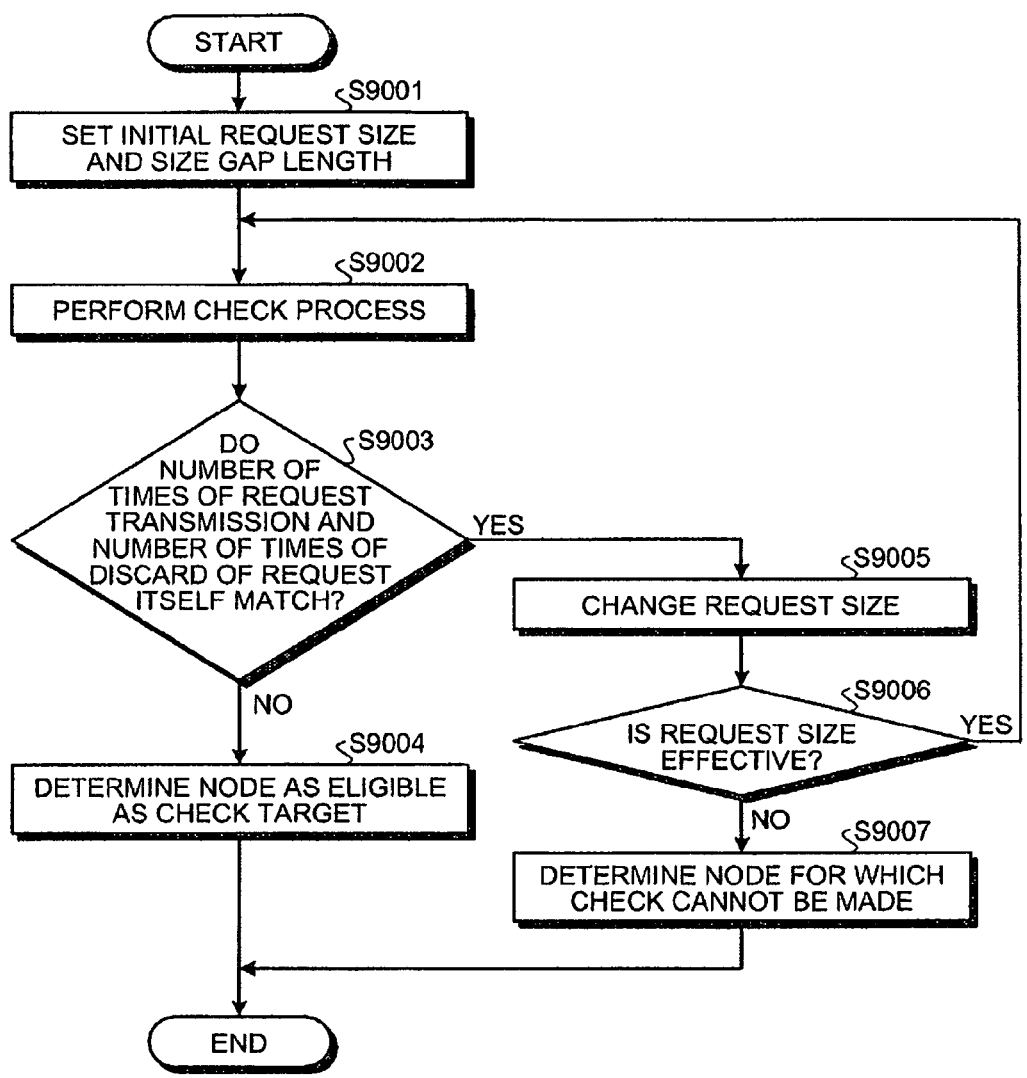
FIG. 19 is a flowchart of a process flow of a surveying node according to a ninth embodiment.

Next, the process of the surveying node 10 according to the ninth embodiment is explained by using FIG. 19. FIG. 19 is a flowchart of a process flow of the surveying node according to the ninth embodiment. In the following, only the points different from the process by the surveying node 10 according to the eighth embodiment are explained.

As depicted in FIG. 19, when obtaining a determination result indicating that the number of times of request transmission and "the number of times of discard of request itself" match ("Yes" at step S9003), the surveying node 10 subtracts the size-gap length from the initial request size to change the request size (step S9005), and then determines whether the request size is effective (step S9006).

When obtaining a determination result indicating that the request size after change is effective ("Yes" at step S9006), the surveying node 10 again performs a check process (step S9002).

On the other hand, when obtaining a determination result indicating that the request size after change is not effective ("No" at step S9006), the surveying node 10 determines that the survey target node 20 as a destination of transmission of a request is a node for which a packet discard check cannot be made for each route (step S9007).

Effects of the Ninth Embodiment

As explained above, according to the ninth embodiment, more survey target nodes 20 can be taken as targets for surveying a packet discard for each route.

[j] Tenth Embodiment

While the first to ninth embodiments have been explained, the present invention can be implemented as various different embodiments other than the embodiments explained above. In the following, another embodiment is explained as a tenth embodiment.

The process procedure, the control procedure, specific names, and information including various data and parameters (for example, "Req_1-1" depicted in FIG. 1) explained in the specification and depicted in the drawings can be arbitrarily changed unless otherwise specified.

Also, each component of each device depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use. For example, the packet transmitting unit 12 and the packet receiving unit 13 depicted in FIG. 3 may be unified for construction. Further, the surveying node is not limited to a relay node and may be a network management server, a terminal node and the like. The survey target node is not limited to a relay node and may be a terminal node and the like.

Furthermore, all or arbitrary part of the process functions performed in each component can be achieved by a Central Processing Unit (CPU) and a program analyzed and executed on that CPU, or can be achieved as hardware with a wired logic.

Still further, the detecting method explained in the embodiments can be achieved by executing a program prepared in advance on a computer, such as a personal computer or work station. This program can be distributed over a network, such as the Internet. Furthermore, this program can be recorded on a computer-readable recording medium, such as a hard disk, flexible disk (FD), compact-disk read only memory (CD-ROM), magneto-optical disk (MO), and digital versatile disk (DVD), and can be read by the computer from the recording medium for execution.

According to the embodiments disclosed herein, the load on the network administrator can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer readable storage medium containing instructions that, when executed by a computer, causes the computer that functions as a surveying node to perform:

transmitting a request to a survey target node that returns a response formed of a plurality of response packets obtained by dividing the response only when the request formed of a plurality of request packets obtained by dividing the request is reconstructed; and determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed, wherein in the transmitting, the request is transmitted to the survey target node every time a determination process is performed in the determining until the number of times of transmission indicative of the number of times of transmitting the request reaches a predetermined number of time set in advance, and in the determining, the determination process is performed every time the request is transmitted in the transmitting, the instructions further cause the computer to perform:

counting the number of times of discard of request indicative of the number of times of determining in the determining that any of the request packets has been discarded; and calculating an expected value representing, as a numerical value, a possibility of discarding each packet transmitted from the surveying node itself to the survey target node before the packet reaches the survey target node, based on the number of times of discard of request counted in the counting, the number of times of transmission, and the request division number indicative of the number of request packets generated by dividing the request.

2. The non-transitory computer readable storage medium according to claim 1, wherein in the transmitting, the request is transmitted to each of a plurality of survey target nodes, and in the determining, the determination process is performed for each of the survey target nodes.

3. The non-transitory computer readable storage medium according to claim 1, wherein in the transmitting, the request is transmitted every time a post-transmission elapse counter value indicative of an elapsed time after the request is transmitted at a previous time reaches a predetermined value set in advance.

4. A computer that functions as a surveying node, comprising:

a request transmitting unit that transmits a request to a survey target node that returns a response formed of a plurality of response packets obtained by dividing the response only when the request formed of a plurality of request packets obtained by dividing the request is reconstructed; and a determining unit that determines that any of request packets has been discarded on a first route from the surveying node itself as a transmission source of the request to the survey target node when no response packet has been received at all from the survey target node, and determines that any of the response packets has been discarded on a second route from the survey target node to the surveying node itself as the transmission source of the request when one or more response packets have been received from the survey target node but the response cannot be reconstructed, wherein the request transmitting unit transmits the request to the survey target node every time a determination process is performed by the determining unit until the number of times of transmission indicative of the number of times of transmitting the request reaches a predetermined number of time set in advance, and the determining unit performs the determination process every time the request is transmitted by the request transmitting unit, and counts the number of times of discard of request indicative of the number of times of determining that any of the request packets has been discarded, the computer further comprising:

an expected-value calculating unit that calculates an expected value representing, as a numerical value, a possibility of discarding each packet transmitted from the surveying node itself to the survey target node before the packet reaches the survey target node, based on the number of times of discard of request counted by the determining unit, the number of times of transmission, and the request division number indicative of the number of request packets generated by dividing the request.

5. A detecting method comprising:

transmitting a request to a survey target node that returns a response formed of a plurality of response packets obtained by dividing the response only when the request formed of a plurality of request packets obtained by dividing the request is reconstructed; and determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed, wherein in the transmitting, the request is transmitted to the survey target node every time a determination process is performed in the determining until the number of times of transmission indicative of the number of times of transmitting the request reaches a predetermined number of time set in advance, and in the determining, the determination process is performed every time the request is transmitted in the transmitting, the detecting method further comprising:

counting the number of times of discard of request indicative of the number of times of determining in the determining that any of the request packets has been discarded; and calculating an expected value representing, as a numerical value, a possibility of discarding each packet transmitted from the surveying node itself to the survey target node before the packet reaches the survey target node, based on the number of times of discard of request counted in the counting, the number of times of transmission, and the request division number indicative of the number of request packets generated by dividing the request.

6. A non-transitory computer readable storage medium containing instructions that, when executed by a computer, causes the computer that functions as a surveying node to perform:

transmitting a request to a survey target node that returns a response formed of a plurality of response packets obtained by dividing the response only when the request formed of a plurality of request packets obtained by dividing the request is reconstructed; and determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed, wherein in the transmitting, the request is transmitted to the survey target node every time a determination process is performed in the determining until the number of times of transmission indicative of the number of times of transmitting the request reaches a predetermined number of time set in advance, and in the determining, the determination process is performed every time the request is transmitted in the transmitting, the instructions further cause the computer to perform:

counting the number of times of discard of request indicative of the number of times of determining in the determining that any of the request packets has been discarded; and calculating an expected range representing, as a numerical range, a possibility of discarding each packet transmitted from the surveying node itself to the survey target node before the packet reaches the survey target node, based on the number of times of discard of request counted in the counting, the number of times of transmission, and the request division number indicative of the number of request packets generated by dividing the request.

7. The non-transitory computer readable storage medium according to claim 6, wherein in the transmitting, the request is transmitted to each of a plurality of survey target nodes, and in the determining, the determination process is performed for each of the survey target nodes.

8. The non-transitory computer readable storage medium according to claim 6, wherein in the transmitting, the request is transmitted every time a post-transmission elapse counter value indicative of an elapsed time after the request is transmitted at a previous time reaches a predetermined value set in advance.

9. The non-transitory computer readable storage medium containing instructions that, when executed by a computer, causes the computer that functions as a surveying node to perform:

transmitting a request to a survey target node that returns a response formed of a plurality of response packets obtained by dividing the response only when the request formed of a plurality of request packets obtained by dividing the request is reconstructed; and determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed, wherein in the transmitting, the request is transmitted to the survey target node every time a determination process is performed in the determining until the number of times of transmission indicative of the number of times of transmitting the request reaches a predetermined number of time set in advance, and in the determining, the determination process is performed every time the request is transmitted in the transmitting, the instructions further cause the computer to perform:

counting the number of times of discard of request indicative of the number of times of determining in the determining that any of the request packets has been discarded;

counting the number of discarded response packets indicative of the number of packets not received as response packets from the survey target node when it is determined in the determining that any of the response packets from the survey target node has been discarded; and calculating a discard rate representing, as a numerical value, a probability of discarding each packet transmitted from the survey target node to the surveying node itself until the packet reaches the surveying node itself, based on the number of times of discard of request counted in the counting of the number of times of discard of request, the number of times of transmission, the response division number indicative of the number of response packets generated by dividing the response, and the number of discarded response packets counted in the counting of the number of discarded response packets.

10. The non-transitory computer readable storage medium according to claim 9, wherein in the transmitting, the request is transmitted to each of a plurality of survey target nodes, and in the determining, the determination process is performed for each of the survey target nodes.

11. The non-transitory computer storage medium according to claim 9, wherein in the transmitting, the request is transmitted every time a post-transmission elapse counter value indicative of an elapsed time after the request is transmitted at a previous time reaches a predetermined value set in advance.

12. A non-transitory computer readable storage medium containing instructions that, when executed by a computer, causes the computer that functions as a surveying node to perform:

transmitting a request to a survey target node that returns a response formed of a plurality of response packets obtained by dividing the response only when the request formed of a plurality of request packets obtained by dividing the request is reconstructed;

determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed;

counting the number of times of discard of request indicative of the number of times of determining in the determining that any of the request packets has been discarded; and determining that the survey target node are not eligible as a check target when the number of times of discard of request counted in the counting and the number of times of transmission match.

13. The non-transitory computer readable storage medium according to claim 12, wherein in the transmitting, the request is transmitted to each of a plurality of survey target nodes, and in the determining, the determination process is performed for each of the survey target nodes.

14. The non-transitory computer readable storage medium according to claim 12, wherein
in the transmitting, the request is transmitted every time a post-transmission elapse counter value indicative of an elapsed time after the request is transmitted at a previous time reaches a predetermined value set in advance.

15. The non-transitory computer readable storage medium according to claim 12, wherein
when the survey target node is determined as not eligible as a check target in the determining of non-eligibility, a size of the request is changed in the transmitting for retransmission of the request packets.

16. A computer that functions as a surveying node, comprising:
a request transmitting unit that transmits a request to a survey target node that returns a response formed of a plurality of response packets obtained by dividing the response only when the request formed of a plurality of request packets obtained by dividing the request is reconstructed; and
a determining unit that determines that any of request packets has been discarded on a first route from the surveying node itself as a transmission source of the request to the survey target node when no response packet has been received at all from the survey target node, and determines that any of the response packets has been discarded on a second route from the survey target node to the surveying node itself as the transmission source of the request when one or more response packets have been received from the survey target node but the response cannot be reconstructed, wherein
the request transmitting unit transmits the request to the survey target node every time a determination process is performed by the determining unit until the number of times of transmission indicative of the number of times of transmitting the request reaches a predetermined number of time set in advance, and
the determining unit performs the determination process every time the request is transmitted by the request transmitting unit, and counts the number of times of discard of request indicative of the number of times of determining that any of the request packets has been discarded,
the computer further comprising:
an expected-range calculating unit that calculates an expected range representing, as a numerical range, a possibility of discarding each packet transmitted from the surveying node itself to the survey target node before the packet reaches the survey target node, based on the number of times of discard of request counted by the determining unit, the number of times of transmission, and the request division number indicative of the number of request packets generated by dividing the request.

17. A computer that functions as a surveying node, comprising:
a request transmitting unit that transmits a request to a survey target node that returns a response formed of a plurality of response packets obtained by dividing the response only when the request formed of a plurality of request packets obtained by dividing the request is reconstructed; and
a determining unit that determines that any of request packets has been discarded on a first route from the surveying node itself as a transmission source of the request to the survey target node when no response packet has been received at all from the survey target node, and determines that any of the response packets has been discarded on a second route from the survey target node to the surveying node itself as the transmission source of the request when one or more response packets have been received from the survey target node but the response cannot be reconstructed, wherein
the request transmitting unit transmits the request to the survey target node every time a determination process is performed by the determining unit until the number of times of transmission indicative of the number of times of transmitting the request reaches a predetermined number of time set in advance, and
the determining unit performs the determination process every time the request is transmitted by the request transmitting unit, counts the number of times of discard of request indicative of the number of times of determining that any of the request packets has been discarded, and counts the number of discarded response packets indicative of the number of packets not received as response packets from the survey target node when it is determined that any of the response packets from the survey target node has been discarded,
the computer further comprising:
a discard-rate calculating unit that calculates a discard rate representing, as a numerical value, a probability of discarding each packet transmitted from the survey target node to the surveying node itself until the packet reaches the surveying node itself, based on the number of times of discard of request counted by the determining unit of the number of times of discard of request, the number of times of transmission, the response division number indicative of the number of response packets generated by dividing the response, and the number of discarded response packets counted by the determining unit of the number of discarded response packets.

18. A computer that functions as a surveying node, comprising:
a request transmitting unit that transmits a request to a survey target node that returns a response formed of a plurality of response packets obtained by dividing the response only when the request formed of a plurality of request packets obtained by dividing the request is reconstructed; and
a determining unit that determines that any of request packets has been discarded on a first route from the surveying node itself as a transmission source of the request to the survey target node when no response packet has been received at all from the survey target node, determines that any of the response packets has been discarded on a second route from the survey target node to the surveying node itself as the transmission source of the request when one or more response packets have been received from the survey target node but the response cannot be reconstructed, counts the number of times of discard of request indicative of the number of times of determining that any of the request packets has been discarded, and determines that the survey target node are not eligible as a check target when the number of times of discard of request counted in the counting and the number of times of transmission match; and
a discard-rate calculating unit that calculates a discard rate representing, as a numerical value, a probability of discarding each packet transmitted from the survey target node to the surveying node itself until the packet reaches the surveying node itself, based on the number of times of discard of request counted by the determining unit of the number of times of discard of request, the number of times of transmission, the response division number indicative of the number of response packets generated by dividing the response, and the number of discarded response packets counted by the determining unit of the number of discarded response packets.

19. A detecting method comprising:
transmitting a request to a survey target node that returns a response formed of a plurality of response packets obtained by dividing the response only when the request formed of a plurality of request packets obtained by dividing the request is reconstructed; and
determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed, wherein
in the transmitting, the request is transmitted to the survey target node every time a determination process is performed in the determining until the number of times of transmission indicative of the number of times of transmitting the request reaches a predetermined number of time set in advance, and
in the determining, the determination process is performed every time the request is transmitted in the transmitting,
the detecting method further comprising:
counting the number of times of discard of request indicative of the number of times of determining in the determining that any of the request packets has been discarded; and
calculating an expected range representing, as a numerical range, a possibility of discarding each packet transmitted from the surveying node itself to the survey target node before the packet reaches the survey target node, based on the number of times of discard of request counted in the counting, the number of times of transmission, and the request division number indicative of the number of request packets generated by dividing the request.

20. A detecting method comprising:
transmitting a request to a survey target node that returns a response formed of a plurality of response packets obtained by dividing the response only when the request formed of a plurality of request packets obtained by dividing the request is reconstructed; and
determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed, wherein
in the transmitting, the request is transmitted to the survey target node every time a determination process is performed in the determining until the number of times of transmission indicative of the number of times of transmitting the request reaches a predetermined number of time set in advance, and
in the determining, the determination process is performed every time the request is transmitted in the transmitting,
the detecting method further comprising:
counting the number of times of discard of request indicative of the number of times of determining in the determining that any of the request packets has been discarded;
counting the number of discarded response packets indicative of the number of packets not received as response packets from the survey target node when it is determined in the determining that any of the response packets from the survey target node has been discarded; and
calculating a discard rate representing, as a numerical value, a probability of discarding each packet transmitted from the survey target node to the surveying node itself until the packet reaches the surveying node itself, based on the number of times of discard of request counted in the counting of the number of times of discard of request, the number of times of transmission, the response division number indicative of the number of response packets generated by dividing the response, and the number of discarded response packets counted in the counting of the number of discarded response packets.

21. A detecting method comprising:
transmitting a request to a survey target node that returns a response formed of a plurality of response packets obtained by dividing the response only when the request formed of a plurality of request packets obtained by dividing the request is reconstructed;
determining that any of request packets has been discarded on a first route from the surveying node itself as a transmission source of the request to the survey target node when no response packet has been received at all from the survey target node, and determining that any of the response packets has been discarded on a second route from the survey target node to the surveying node itself as the transmission source of the request when one or more response packets have been received from the survey target node but the response cannot be reconstructed;
counting the number of times of discard of request indicative of the number of times of determining in the determining that any of the request packets has been discarded; and
determining that the survey target node are not eligible as a check target when the number of times of discard of request counted in the counting and the number of times of transmission match; and a discard-rate calculating unit that calculates a discard rate representing, as a numerical value, a probability of discarding each packet transmitted from the survey target node to the surveying node itself until the packet reaches the surveying node itself, based on the number of times of discard of request counted by the determining unit of the number of times of discard of request, the number of times of transmission, the response division number indicative of the number of response packets generated by dividing the response, and the number of discarded response packets counted by the determining unit of the number of discarded response packets.

* * * * *